United States Patent
Shekhawat et al.

(10) Patent No.: US 11,593,336 B2
(45) Date of Patent: *Feb. 28, 2023

(54) DATA PIPELINE BRANCHING

(71) Applicant: Palantir Technologies Inc., Palo Alto, CA (US)

(72) Inventors: Vipul Shekhawat, Brooklyn, NY (US); Eliot Ball, London (GB); Mikhail Proniushkin, New York, NY (US); Meghan Nayan, New York, NY (US); Mihir Rege, London (GB)

(73) Assignee: Palantir Technologies Inc., Denver, CO (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/132,807

(22) Filed: Dec. 23, 2020

(65) Prior Publication Data
US 2021/0149857 A1  May 20, 2021

Related U.S. Application Data

(63) Continuation of application No. 16/230,769, filed on Dec. 21, 2018, now Pat. No. 10,922,291.

(51) Int. Cl.
*G06F 16/21* (2019.01)
*G06F 16/23* (2019.01)
*G06F 11/14* (2006.01)

(52) U.S. Cl.
CPC ........ *G06F 16/219* (2019.01); *G06F 11/1451* (2013.01); *G06F 16/2379* (2019.01); *G06F 2201/80* (2013.01); *G06F 2201/84* (2013.01)

(58) Field of Classification Search
CPC ............... G06F 16/219; G06F 16/2379; G06F 11/1451; G06F 2201/80; G06F 2201/84
See application file for complete search history.

(56) References Cited

U.S. PATENT DOCUMENTS 4,912,637 A * 3/1990 Sheedy ............... G06F 8/71
707/999.203
5,649,200 A  7/1997 Leblang et al.
(Continued)

FOREIGN PATENT DOCUMENTS

EP  3018553 A1  5/2016

OTHER PUBLICATIONS

Harlev et al., "Should I store generated code in source control" Apr. 23, 2010, stackoverflow https://stackoverflow.com/questions/893913/should-i-store-generated-code-in-source-control.
(Continued)

*Primary Examiner* — Alford W Kindred
*Assistant Examiner* — Tiffany Thuy Bui
(74) *Attorney, Agent, or Firm* — Lowenstein Sandler LLP

(57) ABSTRACT

A workbook management system provides a master branch of a data pipeline comprising a pointer(s) to a snapshot(s) of an initial dataset(s), a first logic, and a pointer(s) to a snapshot(s) of a first derived dataset(s) resulting from applying the first logic to the initial dataset(s). Responsive to user input requesting a test branch corresponding to the master branch, the system creates the test branch comprising the pointer(s) to the snapshot(s) of the initial dataset(s) and a copy of the first logic. The system receives a request to modify the test branch comprising at least one change to the copy of the first logic, and modifies the test branch independently of the master branch to include second logic reflecting the at least one change to the copy of the first logic, the pointer(s) to the snapshot(s) of the initial dataset(s), and a pointer(s) to snapshot(s) of a second derived dataset(s) resulting from applying the second logic to the initial dataset(s). Responsive to user input requesting a merge of the modified test branch into the master branch, the system updates the master branch to replace the first logic
(Continued)

with the second logic and to replace the pointer(s) to the snapshot(s) of the first derived dataset(s) with the pointer(s) to the snapshot(s) of the second derived dataset(s).

19 Claims, 11 Drawing Sheets

(56) References Cited

U.S. PATENT DOCUMENTS

| | | | |
|---|---|---|---|
| 5,675,802 | A | 10/1997 | Allen et al. |
| 5,909,689 | A | 6/1999 | Van Ryzin |
| 6,208,990 | B1 | 3/2001 | Suresh et al. |
| 8,332,354 | B1 | 12/2012 | Chatterjee et al. |
| 9,229,952 | B1 | 1/2016 | Meacham et al. |
| 9,424,043 | B1* | 8/2016 | Freeman .............. G06F 9/38 |
| 9,946,738 | B2 | 4/2018 | Meacham et al. |
| 10,146,530 | B1 | 12/2018 | Rajput et al. |
| 11,080,336 | B2* | 8/2021 | Van Dusen ............ G06Q 50/01 |
| 2008/0034327 | A1 | 2/2008 | Cisler et al. |
| 2010/0083230 | A1 | 4/2010 | Ramakrishnan et al. |
| 2010/0257015 | A1 | 10/2010 | Molander |
| 2010/0257515 | A1 | 10/2010 | Bates et al. |
| 2012/0324289 | A1* | 12/2012 | Funnell ............ G06F 11/3688 |
| | | | 714/E11.178 |
| 2013/0246560 | A1 | 9/2013 | Feng et al. |
| 2014/0019423 | A1 | 1/2014 | Liensberger et al. |
| 2014/0080428 | A1* | 3/2014 | Rhoads ............. G06F 16/5838 |
| | | | 455/88 |
| 2014/0297592 | A1 | 10/2014 | Ohtake et al. |
| 2017/0097950 | A1 | 4/2017 | Meacham et al. |
| 2019/0065568 | A1 | 2/2019 | Kothari et al. |
| 2019/0080016 | A1* | 3/2019 | Avihail ................ G06F 16/254 |
| 2019/0207662 | A1* | 7/2019 | Zhou .................... H04W 24/10 |

OTHER PUBLICATIONS

The extended European Search Report for EP Application No. 19219185.6, dated Mar. 31, 2020, 8 pages.

Official Communication for European Patent Application No. 15192965.0 dated Sep. 24, 2018, 5 pages.

Notice of Allowance for U.S. Appl. No. 14/879,916 dated Jun. 22, 2016, 17 pages.

Official Communication for European Patent Application No. 15192965.0 dated Mar. 17, 2016, 7 pages.

Official Communication for U.S. Appl. No. 15/914,215 dated Jun. 11, 2018, 15 pages.

Notice of Allowance for U.S. Appl. No. 15/287,715 dated Dec. 13, 2017.

Official Communication for U.S. Appl. No. 14/879,916 dated Apr. 15, 2016, 4 pages.

Official Communication for U.S. Appl. No. 15/287,715 dated Aug. 16, 2017, 11 pages.

Sink, Version Control by Example Jul. 11, Pyrenean Gold Press, 1st ed, 210 pages.

Sink, Source Control HOWO, Aug. 4, 1996-Aug. 1, 2006, ericsink. com, https://ericsink.com/scm/source_control.html.

* cited by examiner

DATA PIPELINE BRANCHING

RELATED APPLICATION

This application is a continuation of U.S. patent application Ser. No. 16/230,769 filed on Feb. 6, 2019, the entire content of which is incorporated by reference herein.

TECHNICAL FIELD

This disclosure relates to the field of data aggregation and analysis systems, and in particular to data pipeline branching that enables experimentation with data pipelines.

BACKGROUND

Modern data centers often comprise thousands of hosts that operate collectively to service requests from even larger numbers of remote clients. During operation, components of these data centers can produce significant volumes of machine-generated data. A computerized data pipeline is a useful mechanism for processing those large amounts of data. A typical data pipeline is an ad-hoc collection of computer software scripts and programs for processing data extracted from "data sources" and for providing the processed data to "data sinks." As an example, a data pipeline for a large insurance company that has recently acquired a number of smaller insurance companies may extract policy and claim data from the individual database systems of the smaller insurance companies, transform and validate the insurance data in some way, and provide validated and transformed data to various analytical platforms for assessing risk management, compliance with regulations, fraud, etc.

Between the data sources and the data sinks, a data pipeline system is typically provided as a software platform to automate the movement and transformation of data from the data sources to the data sinks. In essence, the data pipeline system shields the data sinks from having to interface with the data sources or even being configured to process data in the particular formats provided by the data sources. Typically, data from the data sources received by the data sinks is processed by the data pipeline system in some way. For example, a data sink may receive data from the data pipeline system that is a combination (e.g., a join) of data of from multiple data sources, all without the data sink being configured to process the individual constituent data formats.

Given the increasing amount of data collected by businesses and other organizations, processing data of all sorts through data pipeline systems can only be expected to increase. This trend is coupled with a need for a more automated way to maintain such systems and for the ability to trace and track data, including old versions of the data, as it moves through the data pipeline from data sources to data sinks.

BRIEF DESCRIPTION OF THE DRAWINGS

The present disclosure will be understood more fully from the detailed description given below and from the accompanying drawings of various implementations thereof, which, however, should not be taken to limit the present disclosure to the specific implementations, but are for explanation and understanding only.

DETAILED DESCRIPTION

Figure 1A:
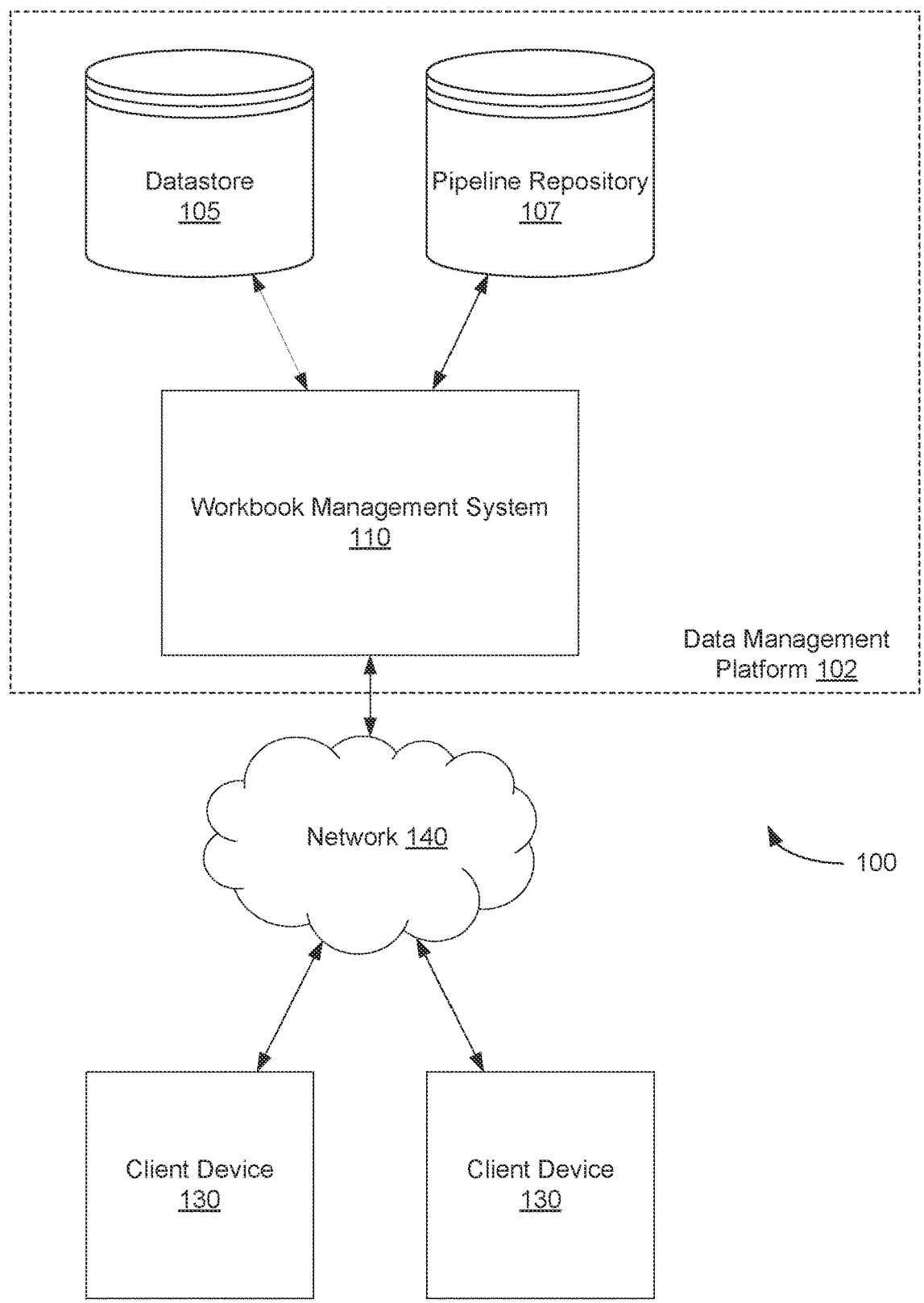
FIG. 1A is a block diagram illustrating a network environment in which a workbook management system may operate, according to an implementation.

The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure are directed to data pipeline branching. A data pipeline may refer to an ordered set of logic (e.g., a collection of computer software scripts or programs) that performs a multi-step transformation of data obtained from data sources to produce one or more output datasets. Each data transformation step applies logic to one or more initial datasets (i.e. collections of data) to produce one or more derived datasets. Certain users may wish to experiment with introducing changes to one or more data transformation steps of the data pipeline (e.g., by changing the logic or using a different initial dataset), but to do so may result in the loss of existing logic or an interruption of the data pipeline. In addition, users may wish to collaborate with colleagues on experimenting with one or more data transformation steps of the data pipeline, but no effective mechanism presently exists that allows them to do so.

Version control systems currently used by software developers when writing code are not tailored for data analysis associated with a data pipeline at a certain point in time, including the state of both the logic, as well as the initial dataset(s) to which the logic is applied. There is no present ability to experiment on the data pipeline without affecting the logic and the initial dataset(s).

Aspects of the present disclosure address the above and other deficiencies by providing a branching tool that allows users to experiment with pipeline workflows. In particular, the branching tool can be used to create a data structure representing a portion (e.g., a particular data transformation step) of the data pipeline. The data structure, referred to herein as a workbook, provides an association between one or more initial datasets, data transformation logic and one or more derived datasets resulting from application of the data transformation logic to the initial dataset(s). The workbook represents the relationships between the initial dataset(s), the data transformation logic and the derived dataset(s) in the form of a dependency graph, in which the nodes represent the datasets, and the edges represent the data transformation logic, such that if two nodes are connected by the edge, then the dataset referenced by the second node may be produced by applying, to the dataset referenced by the first node, the data transformation logic referenced by the edge connecting the two nodes. For example, a user interface may be provided to present the above components of the workbook and their relationships as a dependency graph with the above structure.

When a user creates a new workbook for a portion of a data pipeline, a master branch is formed including one or more initial (e.g., imported) datasets and any logic specified by the user. If the user decides to experiment with a data pipeline portion that corresponds to the master branch, the branching tool can create a new test branch in which the user can experiment. The test branch includes a copy of the logic from the master branch and a pointer(s) to snapshot(s) (or version(s)) of the dataset(s) from the master branch taken at the time the test branch was created. The system keeps track of the state of each dataset at the time of branch creation and any logic (also referred to as a data transformation) run on the test branch will use the stored state to load data. The user can use the test branch to modify logic and derive one or more new datasets without impacting the logic and data in the master branch. In addition, any changes to the master branch will not impact the test branch, which uses the stored state of data and logic from the time of branch creation.

After experimenting with the test branch, the user can request to merge the test branch back into the master branch. A merge preview shows the changes that will be introduced into the master branch as a result of the merge, giving the user a chance to resolve any conflicts before completing the merge. For example, the merge preview may display certain features such as changes to the logic, a change in the number of rows or columns in a derived dataset, a visualization of the change, etc., and allows the user to choose what logic to use in case of merge conflicts. If the logic of the test branch is selected during the merge preview, the system completes the merge by modifying the logic of the master branch (e.g., by overwriting it with the changes made in the test branch). The system may also reassign the pointers from the master branch to the snapshots of the dataset(s) produced by the logic of the test branch.

Aspects of the present disclosure can also allow multiple users to participate in collaborative branch testing. For example, if one user is actively editing the branch, the system can lock out other users to prevent conflicts, notify those users that the branch is in use, and provide those users the opportunity to create another test branch with which they can experiment. Additional details of data pipeline branching are provided below with respect to FIGS. 1-9.

Accordingly, the technology described herein allows users to perform experimentation and/or work concurrently on a portion of a data pipeline without permanently affecting any change to the logic or data of the portion of the data pipeline until the results of the experimentation are determined, reviewed, and approved. In addition, the technology described herein analyzes a modification to a portion of the data pipeline in the context of the entire data pipeline, thereby allowing users to see how their changes to an upstream portion of the data pipeline will affect downstream datasets resulting from the remaining portions of the data pipeline. Since any changes that will be made to the respective master branch as a result of a merge operation are thoroughly tested, previewed and approved prior to being completed, processing resources (e.g., CPU cycles) can be preserved by avoiding tracking and restoring of lost data and/or logic, making further changes to achieve desired results, and other unwanted operations, thereby allowing those processing resources to be utilized for other tasks instead.

FIG. 1A is a block diagram illustrating a network environment in which a workbook management system may operate, according to an implementation. The network environment 100 can include one or more client devices 130 and a data management platform 102, which can be in data communication with each other via network 140. Computer system 900 illustrated in FIG. 9 may be one example of any of client devices 130 or a server(s) in the data management platform 102. The network 140 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 130 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability.

Data management platform 102 may include, for example, a server computer or any other system providing computing capability. Alternatively, data management platform 102 may employ a plurality of computing devices that may be arranged, for example, in one or more server banks or computer banks or other arrangements. Such computing devices may be positioned in a single location or may be distributed among many different geographical locations. For example, data management platform 102 may include a plurality of computing devices that together may comprise a hosted computing resource, a grid computing resource and/ or any other distributed computing arrangement. In some cases, data management platform 102 may correspond to an elastic computing resource where the allotted capacity of processing, network, storage, or other computing-related resources may vary over time.

In some implementations, data management platform 102 can include workbook management system 110, datastore 105 storing the underlying data (e.g., enterprise data), and pipeline repository 107 storing one or more data pipelines. A pipeline includes a set of logic to execute a series of data transformation steps on one or more initial datasets stored in datastore 105. Each data transformation step produces one or more derived datasets that may also be stored in datastore 105. Depending on the implementation, datastore 105 and pipeline repository 107 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The pipeline repository 107 may be part of the datastore 105 or may be a separate repository including, for example, a database, one or more tables, one or more files, etc.

Datastore 105 may include structured and/or unstructured sets of data that can be divided/extracted for provisioning when needed by one or more components of the workbook management system 100. Datastore 105 may include one or more versioned datasets of information. The dataset(s) may be stored in one or more databases, such as a relational database. A relational database may organize information/data into tables, columns, rows, and/or other organizational groupings. Groupings of information may be linked/referenced via use of keys (e.g., primary and foreign keys).

In one implementation, the datasets in datastore 105 are both "immutable" and "versioned" datasets. A dataset may be defined as a named collection of data. The datasets are "immutable" in the sense that it is not possible to overwrite existing dataset data in order to modify the dataset. The datasets are "versioned" in the sense that modifications to a dataset, including historical modifications, are separately identifiable.

Because datasets are immutable and versioned, it is possible to determine the data in a dataset at a point in time in the past, even if that data is no longer in the current version of the dataset. More generally, the ability to trace dataset data to the data source data from which the dataset data was derived or obtained, even if the dataset data is no longer in the current version of the dataset and even if the data source data is no longer available from the data source, is maintained.

An initial dataset may be raw (i.e., un-edited) data that comes directly from a data source (e.g., a full list of customer accounts) and represents the starting point of a data pipeline. Alternatively, an initial dataset may be a derived dataset, which is a dataset that is generated (i.e., built) by editing (e.g., manually or by executing logic of a data transformation step from pipeline repository 107) one or more initial datasets. A derived dataset may be potentially further transformed to provide one or more other datasets as input to the next data transformation step. Each data transformation step may perform one or more operations on the input dataset(s) to produce one or more derived datasets. For example, a data transformation step may produce a derived dataset by filtering records in an input dataset to those comprising a particular value or set of values, or by joining together two related input datasets, or by replacing references in an input dataset to values in another input dataset with actual data referenced. Because derived datasets, like datasets generally, are immutable and versioned in the system, it is possible to trace dataset data to the data source data from which the dataset data was derived or obtained, even if the dataset data is no longer in the current version of the derived dataset and even if the data source data is no longer available from the data source.

In one implementation, data transformation logic stored in pipeline repository 107 is also versioned. Doing so, not only provides the ability to trace dataset data to the data source data the dataset data is based on, but also, if the dataset is a derived dataset, to the version of the data transformation logic used to build the derived dataset. This can be useful for tracking down errors in dataset data caused by errors or "bugs" (i.e., programming errors) in the version of the data transformation logic that was executed to build the dataset.

Workbook management system 110 can assist users in experimenting with data pipelines. In particular, workbook management system 110 may create (e.g., based on user input) a data structure (referred to herein as a workbook) to represent one or more data transformation steps of a data pipeline. A workbook is an association of the initial dataset(s) and the logic to be applied to the initial dataset(s) to generate one or more derived datasets. In the various implementations described herein, a workbook may be described as including one initial dataset or multiple initial datasets, one piece of data transformation logic or multiple pieces of data transformation logic, one derived dataset or multiple derived datasets, or any combination of the above. It should be understood that the concept of branching described herein is applicable to any collection of initial datasets, logic, and derived datasets that are associated with one another via a dependency graph structure. Workbook management system 110 allows users to experiment with a data pipeline via "branching." Branching refers to a tool that enables users to introduce changes to the logic or datasets of a data pipeline portion represented by a workbook without losing existing logic of the workbook or breaking a data pipeline (e.g., a production pipeline). In some implementations, workbook management system 110 provides a user interface that includes a branching option that can be selected by a user to request a working copy of a workbook. In response to such a selection, workbook management system 110 creates a test branch associated with a master branch of the workbook. The master branch is a master copy of the workbook, and the test branch is a working copy of the master branch. The master branch can be created by workbook management system 110 by default (e.g., upon the initial creation of the workbook and regardless of whether or not any test branches of the workbook exist). One or more test branches (e.g., child branches or dependent branches) can then be created from the master branch in response to respective user requests.

The master branch may include one or more pointers to one or more snapshots of one or more initial datasets from datastore 105, a first logic from pipeline repository 107, and one or more pointers to one or more snapshots of one or more first derived datasets from datastore 105 resulting from applying the first logic to the one or more initial datasets. A snapshot of a dataset (e.g., an initial dataset or a derived dataset) captures the state of the corresponding dataset at the point in time that the snapshot was created (e.g., the point in time when the master branch was created, when the initial dataset was added to the master branch, or when the derived dataset was created). As datastore 105 has versioned datasets, each version of a given dataset may represent a corresponding snapshot. For example, each time a change is made to a given dataset, a new version of that dataset (and corresponding snapshot) may be created and stored in datastore 105. Any changes made to the initial dataset by other programs or logic accessing datastore 105 after the snapshot is captured will not affect the snapshot being worked on in the master branch. In one implementation, the master branch includes a pointer to the snapshot, which is physically stored in datastore 105. The pointer may include a computing object that stores a reference to the corresponding snapshot, such as a memory address of the snapshot in datastore 105, a unique identifier of the snapshot, or some other indicative value. Similarly, the master branch may include one or more pointers to one or more snapshots of any derived datasets resulting from execution of the logic against the one or more initial datasets or other previously derived dataset(s).

When the test branch is created, it may include the pointer(s) to the snapshot(s) of the initial dataset(s) in datastore 105 and a copy of the first logic from pipeline repository 107. Workbook management system 110 permits the user to experiment in the test branch, such as by modifying or deleting the existing logic, adding new logic, deriving new datasets, etc., all without impacting the logic and data in the master branch. Although associated with the master branch in a parent/child relationship according to a hierarchy of workbook branches (e.g., the test branch being a copy of the state of the master branch at the time the test branch is created), the test branch is logically separate from the master branch in that changes to the test branch will not be replicated or duplicated in the master branch until the test branch is merged back into the master branch at the request of the user. In addition, any changes to the master branch made after the test branch was created (e.g., as the result of another test branch being merged into the master branch) will not impact the test branch, which uses the stored state of data and logic from the time of test branch creation.

Responsive to user input requesting a merge of the modified test branch into the master branch, workbook management system 100 can initiate a merge operation including updating the master branch to replace the first logic there with a copy of the second logic from the test branch and to replace the pointers to the snapshots of any derived datasets in the master branch with pointers to the snapshots of the derived datasets from the test branch. Prior to completing the merge update, workbook management system 100 can perform a number of preliminary operations, such as determining one or more differences between the logic and the derived datasets in the test branch and the master branch. Workbook management system 100 may generate an indication of these differences and present that indication to the user on one of client devices 130. For example, workbook management system 100 may determine a difference in a number of rows of the derived dataset when the second logic of the test branch is applied to the initial dataset compared to when the first logic of the master branch is applied. Thus, workbook management system 100 may enable the user to preview and approve the changes that would be affected in the master branch if the merge was completed, prior to the merge actually being completed. In addition, workbook management system 100 can determine whether a conflict between the logic of the test branch and the master branch exists. For example, if the logic in both the test branch and the master branch was modified after the test branch was created, workbook management system 100 may obtain user input comprising a selection of which logic to be used in the merge in order to resolve the conflict. After completing these or other preliminary merge operations, workbook management system 100 may complete the merge to update the logic and datasets of the master branch as indicated.

In one implementation, workbook management system 100 maintains the hierarchy of data pipeline branches in datastore 105. As described above, a workbook includes a single master branch which is formed upon the initial creation of the workbook. In the hierarchy, any number of test branches may be formed (i.e., first level children of the master branch). Similarly, any number of child test branches may be formed from one or more of the test branches (i.e., first level children of the test branches and second level children of the master branch). Furthermore, there may be any number of levels in the hierarchy, such as third level children of the master branch, fourth level children of the master branch, etc. Each child branch in the hierarchy includes a logical association of the logic and data of the parent branch from which it is created, and which can be modified independently of the corresponding parent branch. In addition, in one implementation, workbook management system 100 may include merge restrictions which only permit any child branch to be merged back into its immediate parent branch (i.e., the parent branch from which the child branch was created). If it is desired to merge a multi-level child branch with the master branch for example, workbook management system 100 may perform a multi-level merge operation where the multi-level child branch is first merged with each intermediate branch in the hierarchy between it and the master branch. In another implementation, no such merge restrictions are implemented.

Figure 1B:
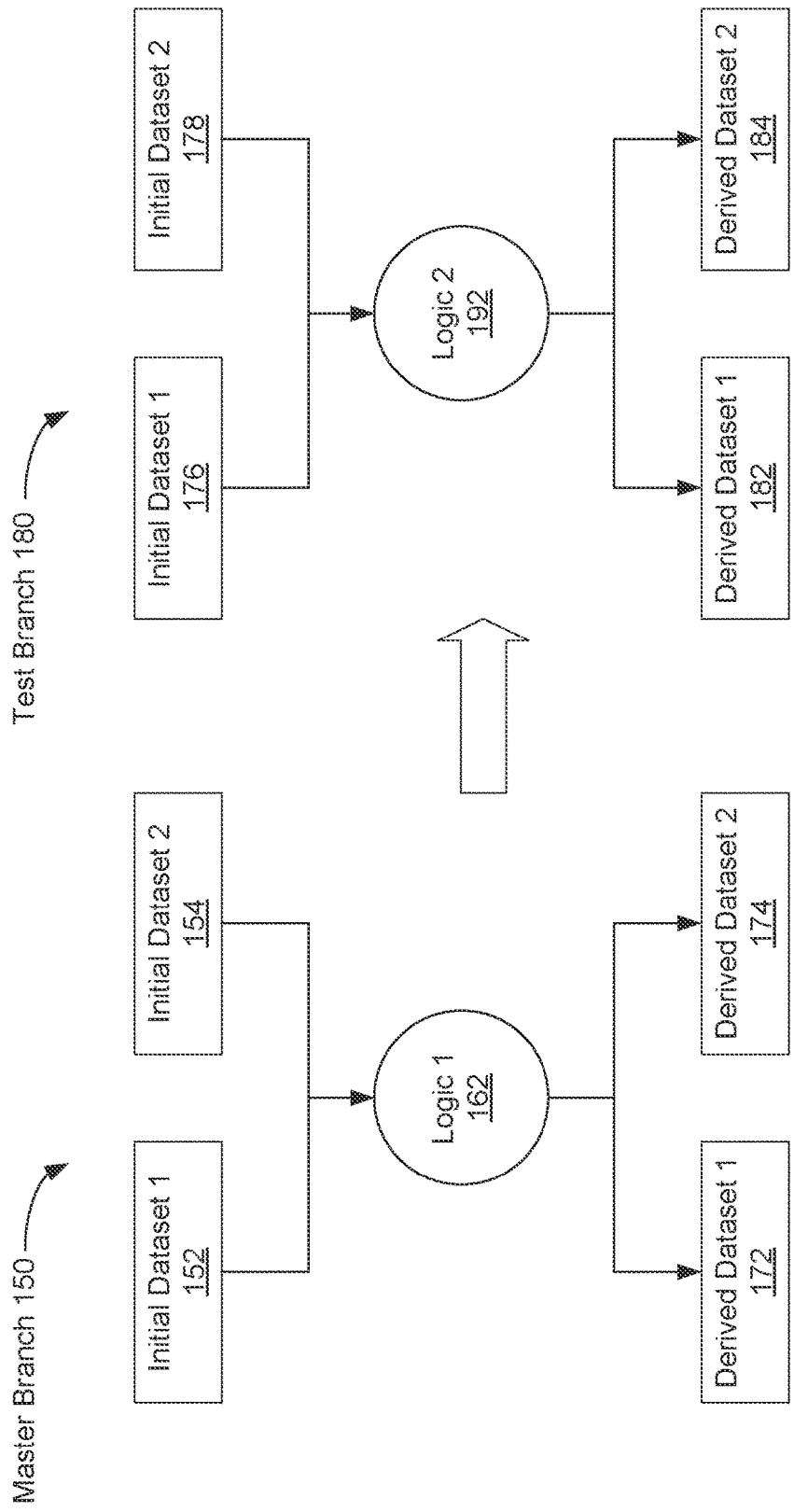
FIG. 1B is a block diagram illustrating sample graph dependency structures of a master branch and a corresponding test branch, according to an implementation.

FIG. 1B is a block diagram illustrating sample graph dependency structures of a master branch and a corresponding test branch. The graph dependency structures include visual representations of the branches of a workbook, including a first graph 150 corresponding to the master branch and a second graph 180 corresponding to the first test branch. In one implementation, the first graph 150 of the master branch includes a first node 152 representing a first initial dataset, a second node 154 representing a second initial dataset, a third node 172 representing a first derived dataset, and a fourth node 174 representing a second derived dataset. One or more edges 162 connect the first node 152 and the second node 154 to third node 172 and fourth node 174. These one or more edges 162 represent the first logic to be applied to the initial dataset(s) in order to produce the derived dataset(s). Although the master branch is shown as having two initial datasets and two derived datasets, any other number of initial datasets and/or derived datasets may be included in the master branch.

In one implementation, the second graph 180 of the test branch includes a first node 176 representing the first initial dataset, a second node 178 representing the second initial dataset, a third node 182 representing a third derived dataset, and a fourth node 184 representing a fourth derived dataset. One or more edges 192 connect the first node 176 and the second node 178 to third node 182 and fourth node 184. These one or more edges 192 represent the second logic to be applied to the initial dataset(s) in order to produce the derived dataset(s). In one implementation, the first and second initial datasets in the test branch are the same as the initial datasets in the master branch. The second logic in the test branch, however, may include one or more differences from the first logic in the master branch. As a result, when the second logic is applied to the first and second initial datasets, the resulting third and fourth derived datasets in the test branch may be different than the derived datasets in the master branch. Although the master branch and the test branch are shown as having two levels (i.e., the initial dataset(s) and the derived datasets(s)) in the corresponding graphs 150 and 180, in other implementations either branch may have any number of additional levels (i.e., another derived dataset(s) resulting from applying additional logic to the first and second derived datasets or the third and fourth derived datasets, respectively).

Figure 2:
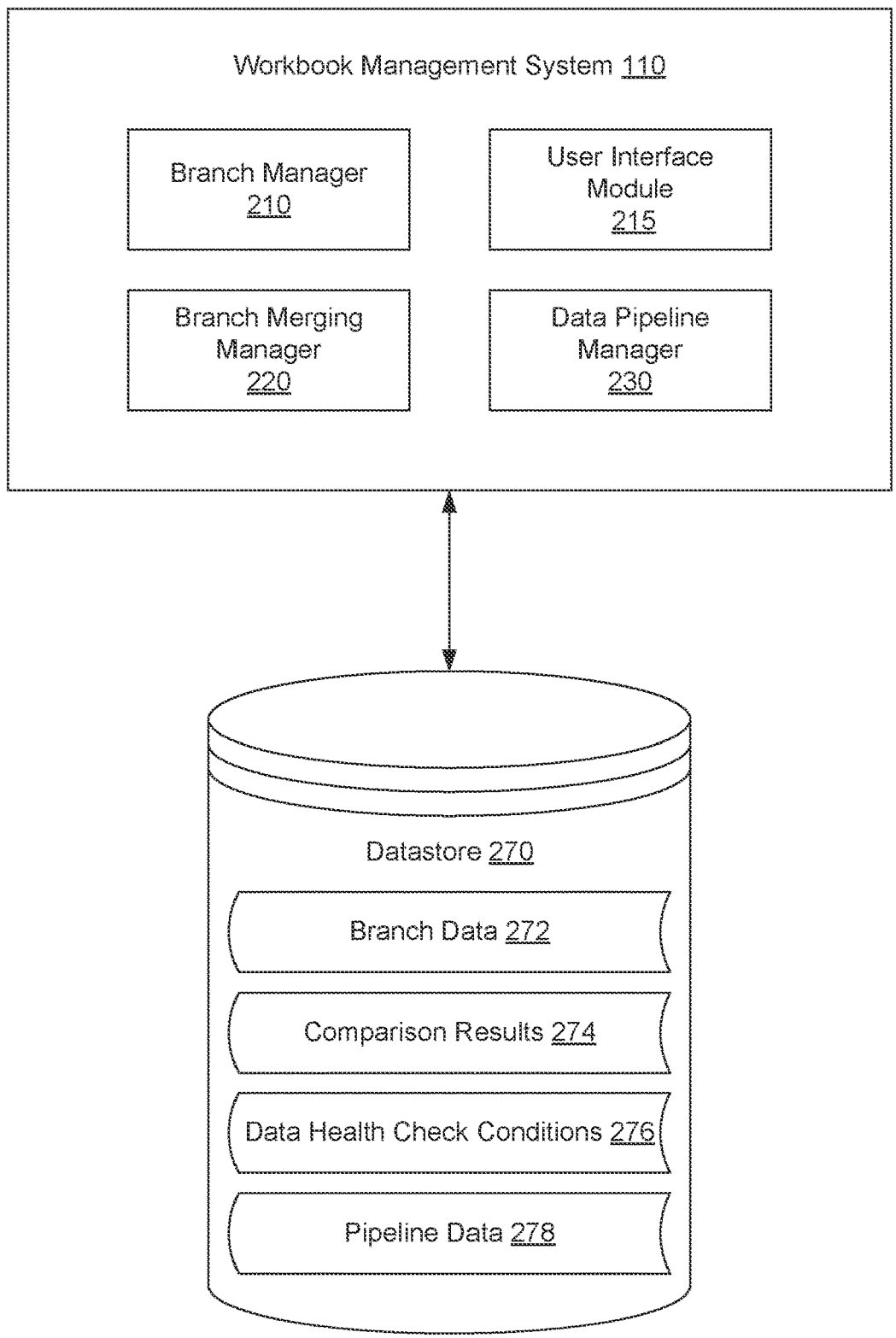
FIG. 2 is a block diagram illustrating a workbook management system, according to an implementation.

FIG. 2 is a block diagram illustrating workbook management system 110, according to an implementation. Workbook management system 110 may include branch manager 210, user interface module 215, branch merging manager 220, and data pipeline manager 230. This arrangement of modules and components may be a logical separation, and in other implementations, these modules or other components can be combined together or separated in further components, according to a particular implementation.

In one implementation, datastore 270 is connected to workbook management system 110 and includes branch data 272, comparison results 274, data health check conditions 276, and pipeline data 278. Branch data 272 can include identifying information and content information for each branch of a number of workbooks maintained by workbook management system 110. For example, branch data 272 may include a set of entries corresponding to each individual workbook. For each workbook, branch data 272 may include a dependency graph structure indicating the master branch and any test/child branches associated therewith. For each individual branch, whether a master branch or a test branch, branch data 272 may include a copy of logic associated with the branch (or a pointer to the corresponding logic in pipeline repository 107) and pointers to snapshots of one or more datasets in data store 105 associated with the branch. Thus, branch data 272 may define the logical association between logic and data that makes up each branch of the workbook. In addition, branch data 272 may include access controls for each branch, such as a whitelist of authorized users, permissions detailing the various actions permitted to be performed on the branch by a given user, restrictions on editing or merging a branch, etc. Comparison results 274 may include data generated in response to comparing two or more pieces of logic or datasets from a test branch and a master branch in preparation for a merge. For example, workbook management system 100 can perform a comparison operation to determine one or more differences between the logic and the derived datasets in the test branch and the master branch of a workbook and may store the results as comparison results 274. Workbook management system 100 may generate an indication of the differences using comparison results 274 and present that indication to the user for approval prior to completing the merge operation. Data health check conditions 276 include one or more conditions to be evaluated as part of a data health check operation prior to performing a merge operation. For example, the data health check conditions 276 may include a determination of whether a derived dataset of the test branch being merged into the master branch was created successfully (e.g., no errors were generated during the creation of the derived dataset), is not stale (e.g., has no out-of-date dependencies), or conforms to some other specified requirement. In one implementation, workbook management system 110 may verify that one or more of the data health check conditions 276 are satisfied period to completing the merge operation. Pipeline data 278 may include data pertaining to a data pipeline including logic of various data transformation steps of the data pipeline. The data pipeline may be structured such that logic is applied to one or more initial datasets to generate one or more derived datasets, which may in turn be used as input to which additional logic is applied to generate additional derived datasets, and so on. Pipeline data 278 may define the initial dataset(s) and various logic, as well as the order in which the logic is to be applied and to which datasets. A change to the logic or datasets upstream in the pipeline can affect downstream derived datasets due to the nature of the data pipeline.

In one implementation, a single computer system (e.g., data management platform 102) may include both workbook management system 110 and datastore 270. In another implementation, datastore 270 may be external to the computer system and may be connected to workbook management system 110 over a network or other connection. In other implementations, workbook management system 110 may include different and/or additional components which are not shown here to simplify the description. Datastore 270 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Datastore 270 may be part of datastore 105 or be separate from datastore 105.

In one implementation, branch manager 210 enables data pipeline branching for the workbook management system 110. Branch manager 210 can generate branches of a workbook representing a portion of a data pipeline, in response to a user request received by user interface module 215, by creating a corresponding entry in branch data 272. In response to a request to create a new workbook, branch manager 210 may generate a master branch by creating an entry in branch data 272 including a pointer(s) to a snapshot(s) of an initial dataset(s) from datastore 105 and a first logic from pipeline repository 107. The initial dataset(s) and the first logic may be specified in the user request, and when the first logic is applied to the initial dataset(s), a first derived dataset(s) may be generated in the master branch. In one implementation, branch manager 210 may add a pointer(s) to a snapshot(s) of the first derived dataset(s) in the entry of branch data 272 corresponding to the master branch of the workbook. Similarly, in response to a request, received by user interface module 215, to create a test branch of an existing workbook, branch manager 210 may generate the test branch by creating an entry in branch data 272 including a pointer(s) to a snapshot(s) of an initial dataset(s) from datastore 105 and a copy of the first logic. Branch manager 210 may similarly create any number of other test branches and child test branches by adding a corresponding entry with logic and dataset pointers to branch data 272.

In response to a request, received by user interface module 215, to modify the test branch, branch manager 210 may modify the test branch to include second logic reflecting at least one change to the copy of the first logic, the pointer to the snapshot(s) of the initial dataset(s), and a pointer(s) to a snapshot(s) of a second derived dataset(s) resulting from applying the second logic to the initial dataset(s). In one implementation, branch manager 210 updates the entry in branch data 272 corresponding to the test branch with the second logic and the pointer(s) to the snapshot(s) of the second derived dataset(s) in data store 105. In addition, in response to a new request, received by user interface module 215, to modify the master branch, branch manager 210 may create a new test branch and modify it independently of any existing test branches to include third logic reflecting at least one change to the first logic, the pointer(s) to the snapshot(s) of the initial dataset(s), and a pointer(s) to a snapshot(s) of a third derived dataset(s) resulting from applying the third logic to the initial dataset(s). In one implementation, branch manager 210 updates the entry in branch data 272 corresponding to the new test branch with the third logic and the pointer(s) to the snapshot(s) of the third derived dataset(s) in data store 105.

In response to a request, received by user interface module 215, to merge the test branch into the master branch, branch merging manager 220 may initiate a merge operation to update the master branch to replace the first logic there with a copy of the second logic from the test branch and to replace the pointer(s) to the snapshot(s) of any derived dataset(s) in the master branch with a pointer(s) to the snapshot(s) of the derived dataset(s) from the test branch. In one implementation, branch merging manager 220 overwrites the first logic with the second logic in the entry in branch data 272 corresponding to the master branch and overwrites the pointer(s) to the first derived dataset(s) with the pointer(s) to the second derived dataset(s) in order to complete the merge. In one implementation, prior to completing the merge update, branch merging manager 220 performs a number of preliminary operations, as will be described further below. In one implementation, after the merge update is completed, branch manager 210 may delete the test branch by removing the entry corresponding to the test branch from branch data 272. In another implementation, branch manager 210 may delete the test branch in response to a user request, received by user interface module 215, without having merged the test branch into the master branch. In yet another implementation, branch manager 210 may maintain the entry for the test branch in branch data 272 even after the test branch has been merged into the master branch.

In one implementation, branch manager 210 further implements branch protection for one or more test branches. Branch protection allows branches within a workbook to be locked down, preventing anyone from editing logic in that branch directly. Branch manager 210 may restrict editing by all users except for the creator of the test branch or may grant certain access or editing privileges to a certain user or group of users. These branch protection limitations and privileges may be defined in branch data 272. Responsive to user input requesting protection of a branch, branch manager 210 may implement the branch protections to prevent other users from further modifying the test branch. Instead, responsive to a request from another user to further modify the test branch, branch manager 210 may create a child test branch from test branch (e.g., including the pointer to the snapshot of the initial dataset and a copy of the second logic from the test branch). The other user can then make changes in the child test branch and merge the child test branch back into the test branch if their permissions allow such action.

In one implementation, user interface module 215 generates a user interface for presentation on any of client devices 130, and processes user interaction with workbook management system 110. For example, user interface module 210 may present a user interface to allow a user to request a branch, edit a branch, delete a branch, or merge two branches together, among other possible interactions. User interface module 215 may receive user input requesting the creation of a branch, the user input including an indication of an initial dataset(s) in datastore 105 and logic designed to operate on the initial dataset(s). User interface module 215 may further receive user input requesting the creation of a test branch corresponding to the master branch, or requesting to modify the test branch. The user input may include one or more changes to the existing logic in the test branch or new logic to replace the existing logic in the test branch. In addition, user interface module 215 may receive user input requesting to merge the test branch into the master branch. In response to the request, user interface module 215 may present an indication of one or more differences between the logic of the test branch and the master branch, one or more differences between the derived datasets of the test branch and the master branch, as merge conflicts, as determined by branch merging manager 220. User interface module 215 may receive user input confirming that the differences between the test branch and the master branch are approved, or a selection of the logic from either the test branch or the master branch to resolve any merge conflict that might be present.

As will be discussed in more detail below, user interface module 215 may also provide a user interface element (e.g., a button or a checkbox) that can be selected by a user to request that the changes to the test branch be propagated downstream to other transformations steps of the data pipeline to see how those changes can affect the entire data pipeline. In response to the user selection, the resulting changes to the downstream datasets can be presented for user review, and the user can then make a more informed decision about the introduced modifications to the test branch.

In one implementation, branch merging manager 220 may compare logic and data from each of a source branch (i.e., the branch being merged), such as the test branch, and a target branch (i.e., the branch being merged into), such as the master branch, to identify any difference between the two. For example, branch merging manager 220 may determine a difference in a number of rows or columns of a derived dataset resulting from the second logic of the test branch being applied to the initial dataset(s) compared to a number of rows or columns of the derived dataset resulting from the first logic of the master branch being applied to the initial dataset(s). In addition, branch merging manager 220 may compare the first logic of the master dataset to the second logic of the target dataset to identify any differences in the second logic. If the same portion of the logic was modified in both the test branch and in the master branch (e.g., as a result of another test branch being merged into the master branch after the test branch was created), branch merging manager 220 may identify a merge conflict. Upon identifying the conflict, branch merging manager 220 may instruct user interface module 215 to present an indication of the conflict and to request user input comprising a selection of the logic from either the test branch or the master branch in order to resolve the conflict. In one implementation, branch merging manager 220 stores the results of any comparison performed between two or more branches as comparison results 274.

In some implementations, branch merging manager 220 may determine that changes have been introduced to the master branch (e.g., to the logic of the master branch) after the user requested the merge. In response, user interface module 215 may update the user interface to reflect this change. In one implementation, branch merging manager 220 may determine that changes have been introduced to the target branch (e.g., to the logic of the target branch) after the user requested the merge. In response, user interface module 215 may update the user interface to reflect this change. In either implementation, user interface module 215 may display a split-screen interface showing the logic before and after the changes were introduced and can receive a user selection of which version of the logic to use in the merge.

In one implementation, branch merging manager 220 performs a data health check operation in response to user interface module receiving a request to perform a merge operation. Branch merging manager 220 may perform the data health check prior to performing the merge operation to ensure that the dataset(s) of the source branch are sufficiently healthy to be merged into the target branch. In one implementation, branch merging manager 220 executes the data health check operation on the derived dataset(s) of the source branch, such as the test branch, to determine whether the derived dataset(s) satisfy one or more of data health check conditions 276. For example, the data health check conditions 276 may include a determination of whether a derived dataset of the test branch being merged into the master branch was created successfully (e.g., no errors were generated during the creation of the derived dataset), is not stale (e.g., has no out-of-date dependencies), or conforms to some other specified requirement. Any workbook may have specified requirements that one or more of these or other of data health check conditions 276 are satisfied before the merge operation can be completed. Upon determining that the required data health check conditions 276 are satisfied, branch merging manager 220 can instruct branch manager 210 to proceed with the requested merge operation. If the required data health check conditions 276 are not satisfied, branch merging manager 220 can instruct user interface module 215 to notify the user to take corrective action. In one implementation, upon receiving a user merge request, branch merging manager 220 creates a separate merge branch to run the logic of the test branch and/or logic of downstream transformation steps independently from the master branch and the test branch.

In one implementation, data pipeline manager 230 manages a data pipeline defined by pipeline data 278. The data pipeline may include logic of multiple data transformation steps. Starting with the initial dataset(s), data pipeline manager 230 may apply logic to generate a derived dataset(s) (e.g., the first derived dataset). Data pipeline manager 230 may further apply additional logic to that derived dataset(s) to generate another derived dataset(s). Pipeline data 278 may define any number of transformation steps and derived datasets that continue in this fashion. In one implementation, such as in request to perform a merge operation, prior to performing the merge operation, data pipeline manager 230 can replace the first derived dataset(s) (e.g., from the master branch) in the data pipeline with the second derived dataset(s) (e.g., from the test branch) applied as an input to the additional logic to derive one or more second additional derived datasets. Due to the differences in logic that generated the first and second derived datasets respectively, the second derived dataset(s) may be different than the first derived dataset(s). As a result, when the additional logic is applied to the second derived dataset(s), the resulting additional derived datasets downstream in the data pipeline may also be different. Data pipeline manager 230 can compare the one or more second additional derived datasets to the one or more first additional derived datasets to identify any differences in the one or more second additional derived datasets resulting from replacing the first derived dataset(s) in the data pipeline with the second derived dataset(s) and can generate an indication of those differences to be presented to the user by user interface module 215. In one implementation, the differences are presented side by side (e.g., in a split-screen interface). Accordingly, the user can see how the changes to the logic in the test branch affect downstream derived datasets in the data pipeline compared to if the first logic in the master branch were used in the data pipeline. User interface module 215 may then receive user input selecting which version of the logic to use (e.g., from the test branch or from the master branch) and data pipeline manager 230 can receive an indication of the selection in order to make any corresponding changes to pipeline data 278 when run in a production environment.

Figure 3A:
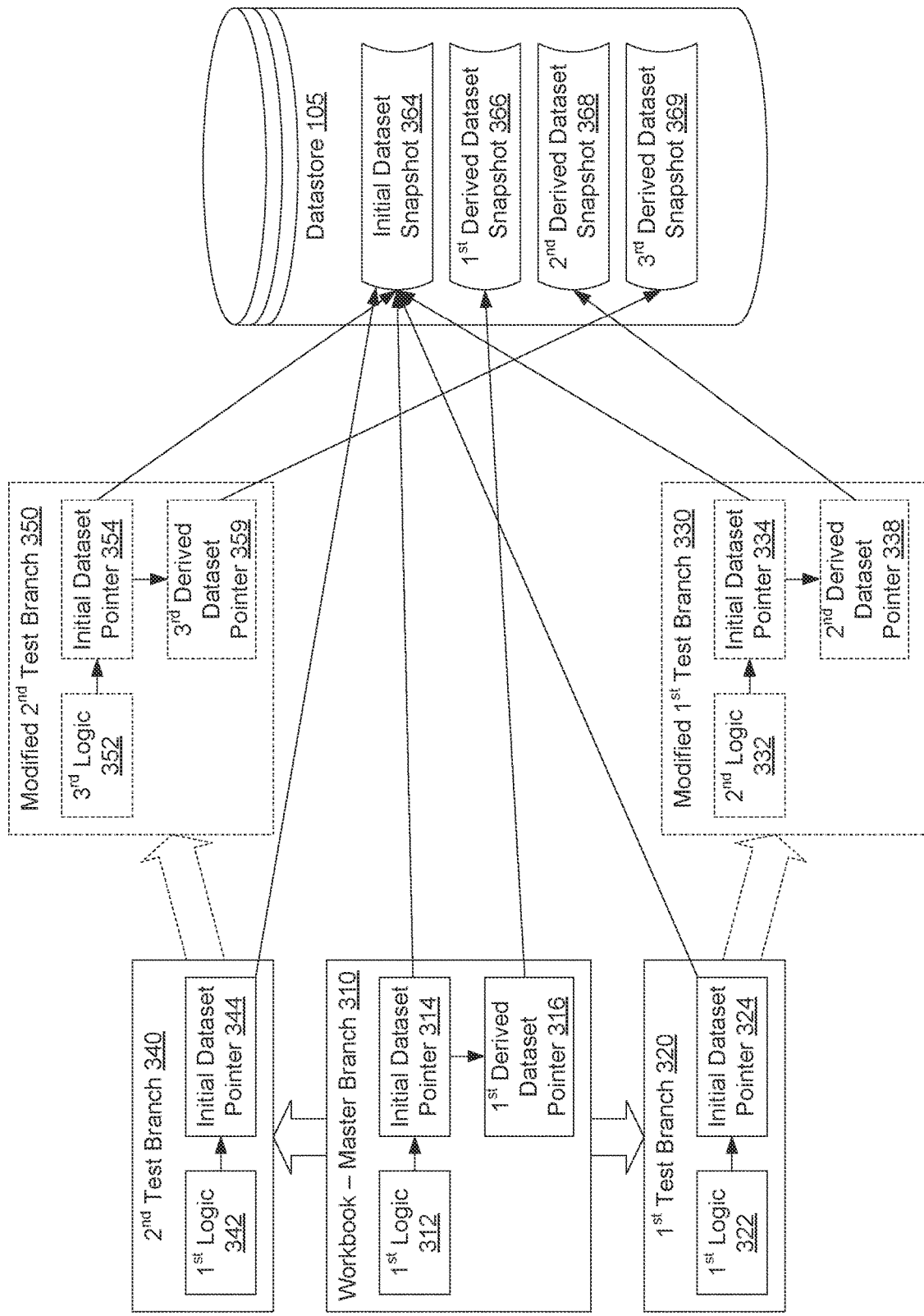
FIGS. 3A and 3B are block diagrams illustrating data pipeline branching, according to an implementation.
Figure 3B:
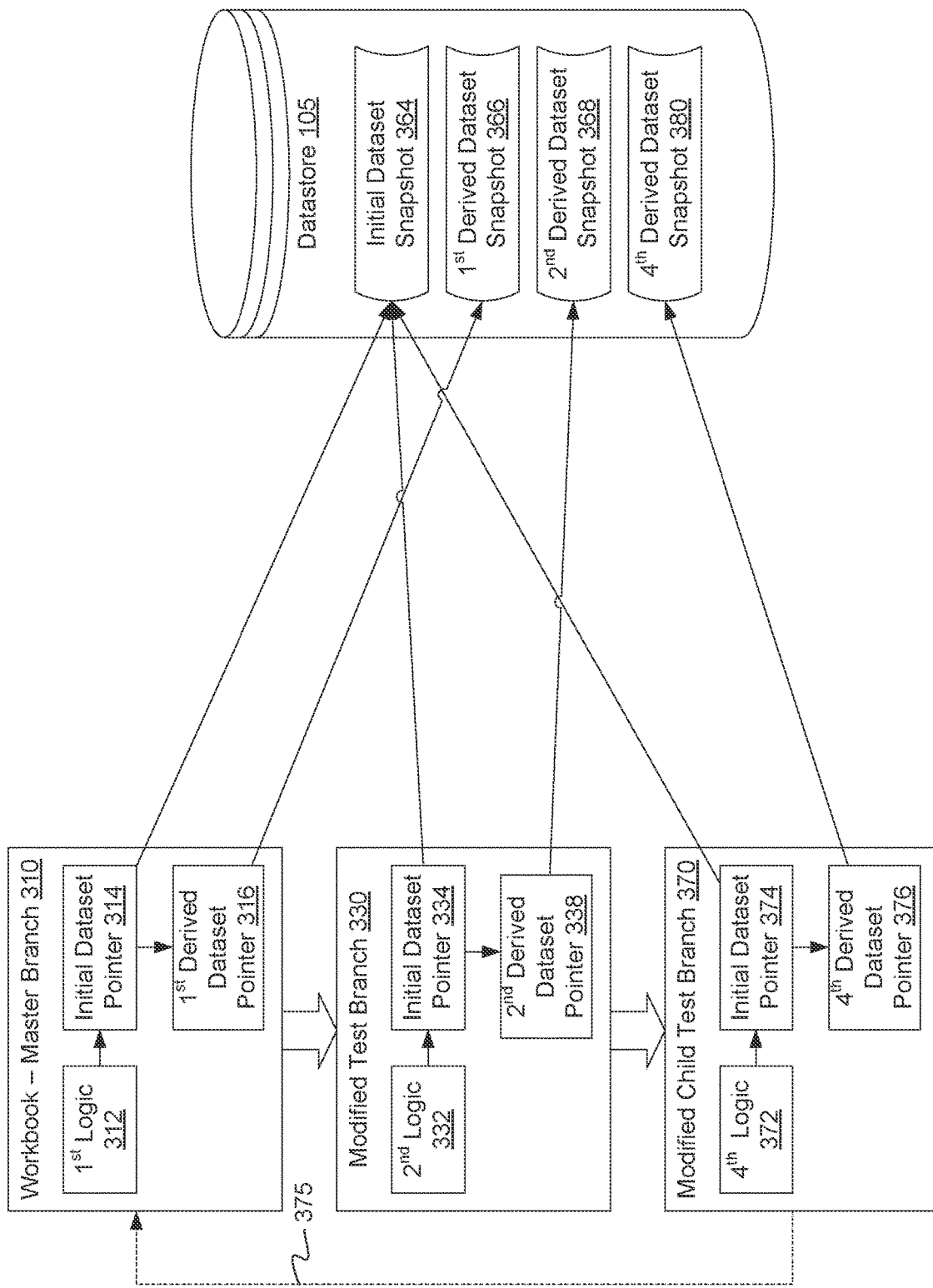

FIGS. 3A and 3B are block diagrams illustrating workbook branching for logic and data, according to an implementation. FIG. 3A illustrates a master branch 310 of a workbook including first logic 312, a pointer 314 to a snapshot of an initial dataset 364 in datastore 105 and a pointer 316 to a snapshot of a first derived dataset 366 resulting from applying the first logic 312 to the initial dataset. In response to user input received by user interface module 215 requesting a test branch of the workbook, branch manager 210 can create a first test branch 320 of the workbook including a copy of the first logic 322 and a pointer 324 to the snapshot of the initial dataset 364 in datastore 105 (and optionally a pointer to the snapshot of the first derived dataset 366). User interface module 215 can receive a request to modify the first test branch 320 and in response, branch manager 210 can create a modified first test branch 330. The modified first test branch 330 may include second logic 332, including at least one change to the copy of the first logic 322, a pointer 334 to the snapshot of the initial dataset 364 in datastore 105 and a pointer 338 to a snapshot of a second derived dataset 368 in datastore 105. In response to user input requesting a merge of the first modified test branch 330 into the master branch 310, branch merging manager 220 can update the master branch 310 to replace the first logic 312 with the second logic 332 and to replace the pointer 316 to the snapshot of the first derived dataset 366 with the pointer 338 to the snapshot of the second derived dataset 368 in branch data 272.

In one implementation, user interface module 215 can further receive user input (e.g., from another user who wants to collaborate on workbook editing) requesting a second test branch of the workbook. In response, branch manager 210 can create the second test branch 340 of the workbook including a copy of the first logic 342 and a pointer 344 to the snapshot of the initial dataset 364 in datastore 105 (and optionally a pointer to the snapshot of the first derived dataset 366). User interface module 215 can receive a request to modify the second test branch 340 and in response, branch manager 210 can create a modified second test branch 350. The modified second test branch 350 may include third logic 352, including at least one change to the copy of the first logic 342, a pointer 354 to the snapshot of the initial dataset 364 in datastore 105 and a pointer 359 to a snapshot of a third derived dataset 369 in datastore 105. In response to user input requesting a merge of the second modified test branch 350 into the master branch 310, branch merging manager 220 can update the master branch 310 to replace the first logic 312 with the third logic 352 and to replace the pointer 316 to the snapshot of the first derived dataset 366 with the pointer 359 to the snapshot of the third derived dataset 369 in branch data 272.

In one implementation, if modified first test branch 330 has already been merged into master branch 310, thereby updating the logic and pointers of master branch 310 as described above, at the time that a request is made to merge modified second test branch 350 into master branch 310, branch merging manager 220 may detect a merge conflict. Since modified second test branch 350 was originally formed from the non-updated master branch 310 which has since been updated, there may be a merge conflict, such as a discrepancy between the logic or datasets. In one implementation, branch merging manager 220 detects this conflict and causes user interface module 215 to notify the user and request user input including a selection of the appropriate version of the logic and/or derived datasets to be included in the master branch 310 after the merge is completed.

FIG. 3B illustrates master branch 310 including first logic 312, a pointer 314 to a snapshot of an initial dataset 364 in datastore 105 and a pointer 316 to a snapshot of a first derived dataset 366 resulting from applying the first logic 312 to the initial dataset. FIG. 3B further illustrates modified first test branch 330 including second logic 332, a pointer 334 to the snapshot of the initial dataset 364 in datastore 105, and a pointer 338 to a snapshot of a second derived dataset 368 in datastore 105. Modified test branch 330 may be formed in response to various user input, as described above. In addition, FIG. 3B illustrates a modified child test branch 370 created as a child of modified test branch 330. Modified child test branch 370 includes fourth logic 372, including at least one change to the second logic 332 of modified test branch 330, a pointer 374 to the snapshot of the initial dataset 364 in datastore 105, and a pointer 376 to a snapshot of a fourth derived dataset 380 in data store 105 resulting from applying the fourth logic 372 to the initial dataset.

In one implementation, modified child test branch 370 is created in response to a user request. In another implementation, modified test branch 330 is protected by branch manager 210 and modified child test branch 370 is created in response to a request from another user lacking the requisite privileges to modify modified test branch 330. In one implementation, modified test branch 330 may be deleted, either after being merged with master branch 310 or in response to a user request without being merged with master branch 310. If modified child test branch 370 still exists (e.g., if modified child test branch 370 had not been previously merged with modified test branch 330), branch manager 210 may associate 375 modified child test branch 370 with master branch 310. In one implementation, branch manager 210 re-parents modified child test branch 370 with master branch 310 since its previous parent was deleted. To do so, branch manager 210 may update the hierarchy of branches in branch data 272 to reflect the re-parenting.

Figure 4:
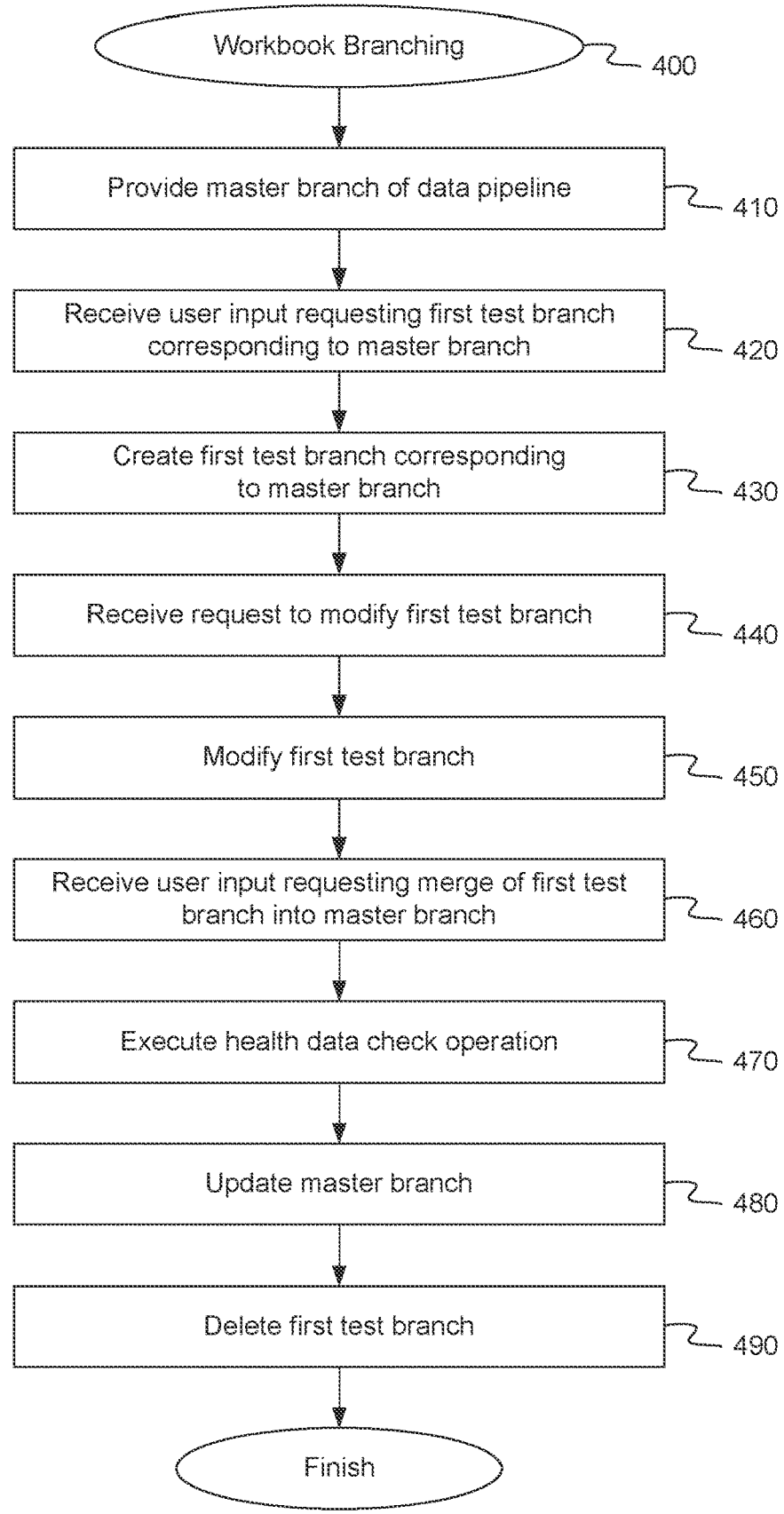
FIG. 4 is a flow diagram illustrating a method of data pipeline branching, according to an implementation.

FIG. 4 is a flow diagram illustrating a method of data pipeline branching, according to an implementation. The method 400 may be performed by processing logic that comprises hardware (e.g., circuitry, dedicated logic, programmable logic, microcode, etc.), software (e.g., instructions run on a processor to perform hardware simulation), or a combination thereof. In one implementation, method 400 may be performed by workbook management system 110, as shown in FIGS. 1 and 2.

Referring to FIG. 4, at block 410, method 400 provides a master branch of a data pipeline. The master branch includes one or more pointers to one or more snapshots of one or more initial datasets, a first logic, and one or more pointers to one or more snapshots of one or more first derived datasets resulting from applying the first logic to the one or more initial datasets. As discussed above, a master branch may be associated with a workbook that represents a portion (e.g., one or more data transformation steps) of the data pipeline. In response to a request to create a new workbook, branch manager 210 may generate a master branch by creating an entry in branch data 272 including a pointer to the one or more snapshots of the one or more initial datasets from datastore 105 and a first logic from pipeline repository 107. The one or more initial datasets and the first logic may be specified in the user request, and when the first logic is applied to the one or more initial datasets, one or more first derived datasets may be generated in the master branch. In one implementation, branch manager 210 may add a pointer to one or more snapshots of the one or more first derived datasets in the entry of branch data 272 corresponding to the master branch.

At block 420, method 400 receives user input requesting a test branch corresponding to the master branch, and at block 430, method 400 creates the test branch comprising the one or more pointers to the one or more snapshots of the one or more initial datasets and a copy of the first logic (and optionally one or more pointers to the one or more snapshots of the one or more first derived datasets). In response to the request, received by user interface module 215, branch manager 210 may generate the test branch by creating an entry in branch data 272 including one or more pointers to one or more snapshots of one or more initial datasets from datastore 105 and a copy of the first logic (and optionally one or more pointers to the one or more snapshots of the one or more first derived datasets). As discussed above, the test branch is associated with the same workbook as the master branch. Branch manager 210 may similarly create any number of other test branches and child test branches by adding a corresponding entry with logic and dataset pointers to branch data 272 (and associating each of the other test branches and the child test branches with the same workbook).

At block 440, method 400 receives a request to modify the test branch, the request comprising at least one change to the copy of the first logic, and at block 450, method 400 modifies the test branch independently of the master branch to include second logic reflecting the at least one change to the copy of the first logic, the one or more pointers to the one or more snapshots of the one or more initial datasets, and one or more pointers to one or more snapshots of one or more second derived datasets resulting from applying the second logic to the one or more initial datasets. In one implementation, branch manager 210 updates the entry in branch data 272 corresponding to the test branch with the second logic and the one or more pointers to the one or more snapshots of the second derived dataset in data store 105.

At block 460, method 400 receives user input requesting a merge of the modified test branch into the master branch. In response to the request, branch merging manager 220 may initiate a merge operation to update the master branch to replace the first logic there with a copy of the second logic from the test branch and to replace the one or more pointers to the one or more snapshots of any derived datasets in the master branch with one or more pointers to the one or more snapshots of the derived datasets from the test branch.

At block 470, method 400 executes a data health check operation on the one or more second derived datasets to determine whether the one or more second derived datasets satisfy one or more conditions of the data health check. In one implementation, branch merging manager 220 may perform the data health check prior to branch merging manager 220 performing the merge operation to ensure that the dataset(s) of the source branch are sufficiently healthy to be merged into the target branch. In one implementation, branch merging manager 220 executes the data health check operation on the derived dataset(s) of the source branch, such as the test branch, to determine whether the derived dataset(s) satisfy one or more of data health check conditions 276. For example, the data health check conditions 276 may include a determination of whether one or more derived datasets of the test branch being merged into the master branch were created successfully (e.g., no errors were generated during the creation of the one or more derived datasets), are not stale (e.g., has no out-of-date dependencies), or conform to some other specified requirement. Any workbook may have specified requirements that one or more of these or other of data health check conditions 276 are satisfied before the merge operation can be completed. Upon determining that the required data health check conditions 276 are satisfied, branch merging manager 220 can instruct branch merging manager 220 to proceed with the requested merge operation. If the required data health check conditions 276 are not satisfied, branch merging manager 220 can instruct user interface module 215 to notify the user to take corrective action.

At block 480, method 400 updates the master branch to replace the first logic with the second logic and to replace the one or more pointers to the one or more snapshots of the one or more first derived datasets with the one or more pointers to the one or more snapshots of the one or more second derived datasets. In one implementation, branch merging manager 220 overwrites the first data with the second data in the entry in branch data corresponding to the master branch and overwrites the one or more pointers to the one or more first device datasets with the one or more pointers to the one or more second derived datasets in order to complete the merge.

At block 490, method 400 deletes the modified test branch. In one implementation, after completing the merge update, branch manager 210 may delete the test branch by removing the entry corresponding to the test branch from branch data 272.

Figure 5:
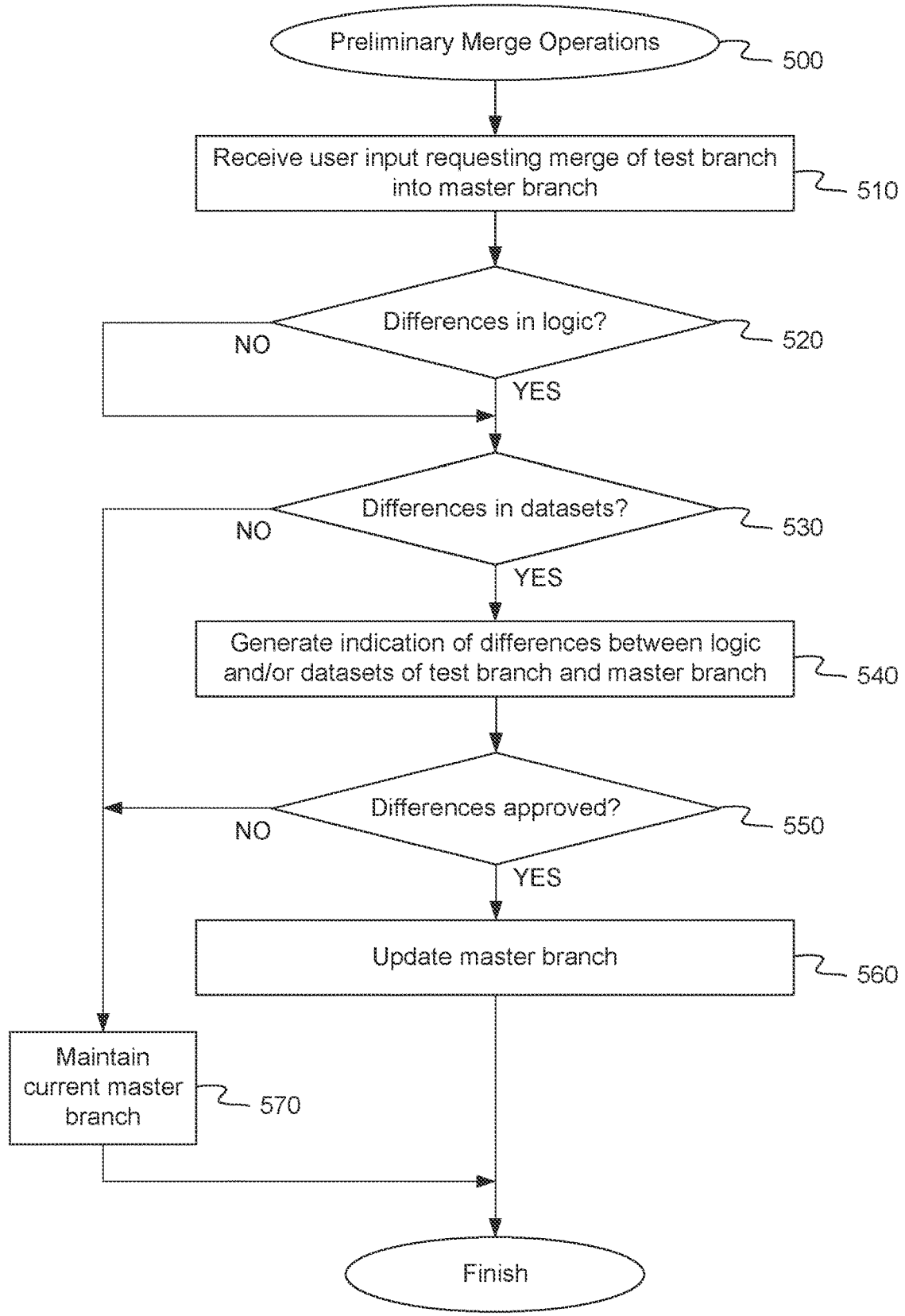
FIG. 5 is a flow diagram illustrating a method of preliminary merge operations for a data pipeline, according to an implementation.

FIG. 5 is a flow diagram illustrating a method of preliminary merge operations for data pipeline branching, according to an implementation. The method 500 may be performed by processing logic that comprises hardware (e.g., circuitry, dedicated logic, programmable logic, microcode, etc.), software (e.g., instructions run on a processor to perform hardware simulation), or a combination thereof. In one implementation, method 500 may be performed by workbook management system 110, as shown in FIGS. 1 and 2.

Referring to FIG. 5, at block 510, method 500 receives user input requesting a merge of the modified test branch into the master branch, and at block 520, method 500 determines whether there are one or more differences between the first logic in the master branch and the second logic in the modified test branch. In one implementation, branch merging manager 220 may compare the first logic of the master dataset to the second logic of the target dataset to identify any differences in the second logic.

At block 530, method 500 determines whether there are one or more differences between the one or more first derived datasets in the master branch and the one or more second derived datasets in the modified test branch. In one implementation, branch merging manager 220 may determine a difference in a number of rows or columns of a derived dataset resulting from the second logic of the test branch being applied to the one or more initial datasets compared to a number of rows or columns of the derived dataset resulting from the first logic of the master branch being applied to the one or more initial datasets.

If there are differences in the logic or datasets, at block 540, method 500 generates an indication of the one or more differences between the logic and the derived datasets of the modified test branch and the master branch. User interface module 215 may present the indication of the differences in order for the user to review and understand how merging the test branch into the master branch will affect the current state of the master branch. At block 550, method 500 determines whether received user input confirms that the one or more differences are approved. If the differences are approved, at block 560, method 500 updates the master branch to replace the first logic with the second logic and to replace the one or more pointers to the one or more snapshots of the one or more first derived datasets with the one or more pointers to the one or more snapshots of the one or more second derived datasets.

If there are no differences in logic or datasets between the test branch and the master branch, or if there are differences but the user input indicates that the differences are not approved, at block 570, method 500 maintains the master branch in its current state including the current logic and pointers to derived dataset(s). In one implementation, method 500 may selectively update portions of the master branch to approve or reject selected differences between the test branch and the master branch.

Figure 6:
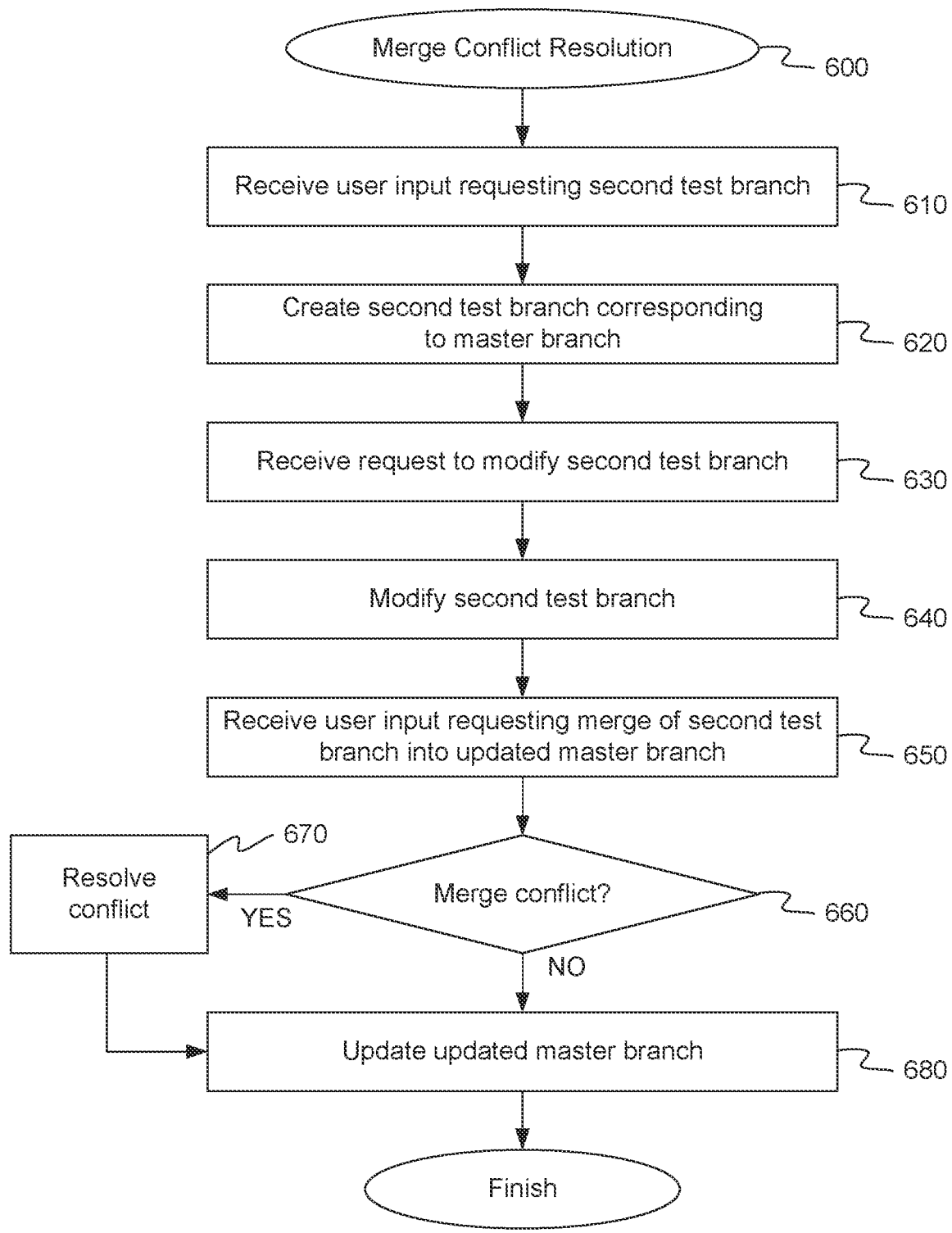
FIG. 6 is a flow diagram illustrating a method of merge conflict resolution for a data pipeline, according to an implementation.

FIG. 6 is a flow diagram illustrating a method of merge conflict resolution for a data pipeline, according to an implementation. The method 600 may be performed by processing logic that comprises hardware (e.g., circuitry, dedicated logic, programmable logic, microcode, etc.), software (e.g., instructions run on a processor to perform hardware simulation), or a combination thereof. In one implementation, method 600 may be performed by workbook management system 110, as shown in FIGS. 1 and 2.

Referring to FIG. 6, at block 610, method 600 receives user input requesting a second test branch corresponding to the master branch, and at block 620, method 600 creates the second test branch comprising the one or more pointers to the one or more snapshots of the one or more initial datasets and a copy of the first logic. In response to the request, received by user interface module 215, branch manager 210 may generate the second test branch by creating an entry in branch data 272 including one or more pointers to one or more snapshots of one or more initial datasets from datastore 105 and a copy of the first logic (and optionally one or more pointers to one or more snapshots of one or more first derived datasets).

At block 630 method 600 receives a request to modify the second test branch, the request comprising at least one change to the copy of the first logic, and at block 640, method 600 modifies the second test branch independently of the master branch to include third logic reflecting the at least one change to the copy of the first logic, the one or more pointers to the one or more snapshots of the one or more initial datasets, and one or more pointers to one or more snapshots of one or more third derived datasets resulting from applying the third logic to the one or more initial datasets. In one implementation, branch manager 210 updates the entry in branch data 272 corresponding to the second test branch with the third logic and the one or more pointers to the one or more snapshots of the one or more third derived datasets in data store 105.

At block 650, method 600 receives user input requesting a merge of the second modified test branch into the master branch. In response to the request, branch merging manager 220 may initiate a merge operation to update the master branch to replace the first logic there with a copy of the third logic from the second test branch and to replace the one or more pointers to the one or more snapshots of any derived dataset(s) in the master branch with one or more pointers to the one or more snapshots of the derived dataset(s) from the second test branch.

At block 640, method 600 determines whether a merge conflict exists between the second logic of the modified test branch and the third logic of the modified master branch. If the same portion of the logic was modified in both the second test branch and in the master branch (e.g., as a result of another test branch being merged into the master branch after the second test branch was created), branch merging manager 220 may identify a merge conflict. Upon identifying the conflict, branch merging manager 220 may instruct user interface module 215 to present an indication of the conflict and to request user input comprising a selection of the logic from either the test branch or the master branch in order to resolve the conflict.

Responsive to determining that a merge conflict exists, at block 650, method 600 receives user input comprising a selection of one of the second logic or the third logic to resolve the merge conflict. If no merge conflict exists, or once the merge conflict has been resolved, at block 660, method 600 updates the master branch. In one implementation, branch merging manager 220 overwrites the first data with the third data in the entry in branch data corresponding to the master branch and overwrites the one or more pointers to the one or more first derived datasets with the one or more pointers to the one or more third derived datasets in order to complete the merge.

Figure 7:
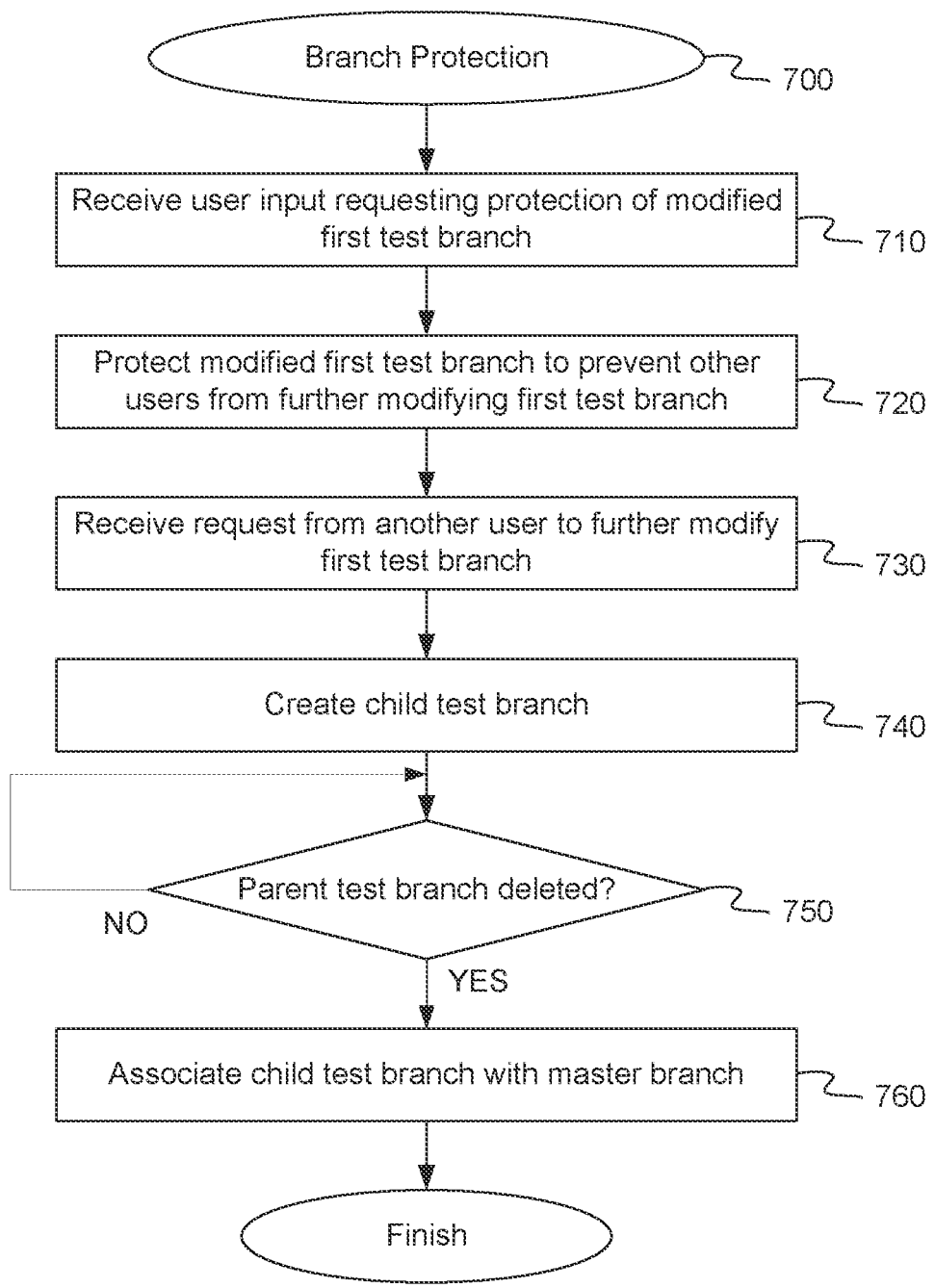
FIG. 7 is a flow diagram illustrating a method of branch protection for a data pipeline, according to an implementation.

FIG. 7 is a flow diagram illustrating a method of branch protection in a data pipeline, according to an implementation. The method 700 may be performed by processing logic that comprises hardware (e.g., circuitry, dedicated logic, programmable logic, microcode, etc.), software (e.g., instructions run on a processor to perform hardware simulation), or a combination thereof. In one implementation, method 700 may be performed by workbook management system 110, as shown in FIGS. 1 and 2.

Referring to FIG. 7, at block 710, method 700 receives user input requesting protection of the modified first test branch, and at block 720, method 700 protects the modified first test branch to prevent other users from further modifying the modified first test branch. In one implementation, branch manager 210 implements branch protection for one or more test branches. Branch protection allows branches within a data pipeline to be locked down, preventing anyone from editing logic in that branch directly. Branch manager 210 may restrict editing by all users except for the creator of the test branch or may grant certain access or editing privileges to a certain user or group of users. These branch protection limitations and privileges may be defined in branch data 272.

At block 730, method 700 receives a request from another user to further modify the modified first test branch, and at block 740, method 700 creates a child test branch from the parent test branch (i.e., the modified first test branch) comprising the one or more pointers to the one or more snapshots of the one or more initial datasets and a copy of the second logic. Responsive to the request from another user to further modify the test branch, branch manager 210 may create a child test branch from test branch (e.g., including the one or more pointers to the one or more snapshots of the one or more initial datasets and a copy of the second logic from the test branch). The other user can then make changes in the child test branch and merge the child test branch back into the test branch if their permissions allow such action.

At block 750, method 700 determines whether the parent test branch (i.e., the modified first test branch) has been deleted and responsive to the parent test branch being deleted, at block 760, method 700 associates the child test branch with the master branch. In one implementation, the modified test branch may be deleted, either after being merged with the master branch or in response to a user request without being merged with the master branch. If the child test branch still exists (e.g., if the child test branch had not been previously merged with the modified test branch), branch manager 210 may associate the child test branch with the master branch. In one implementation, branch manager 210 re-parents the child test branch with master branch 310 since its previous parent was deleted. To do so, branch manager 210 may update the hierarchy of branches in branch data 272 to reflect the re-parenting.

Figure 8A:
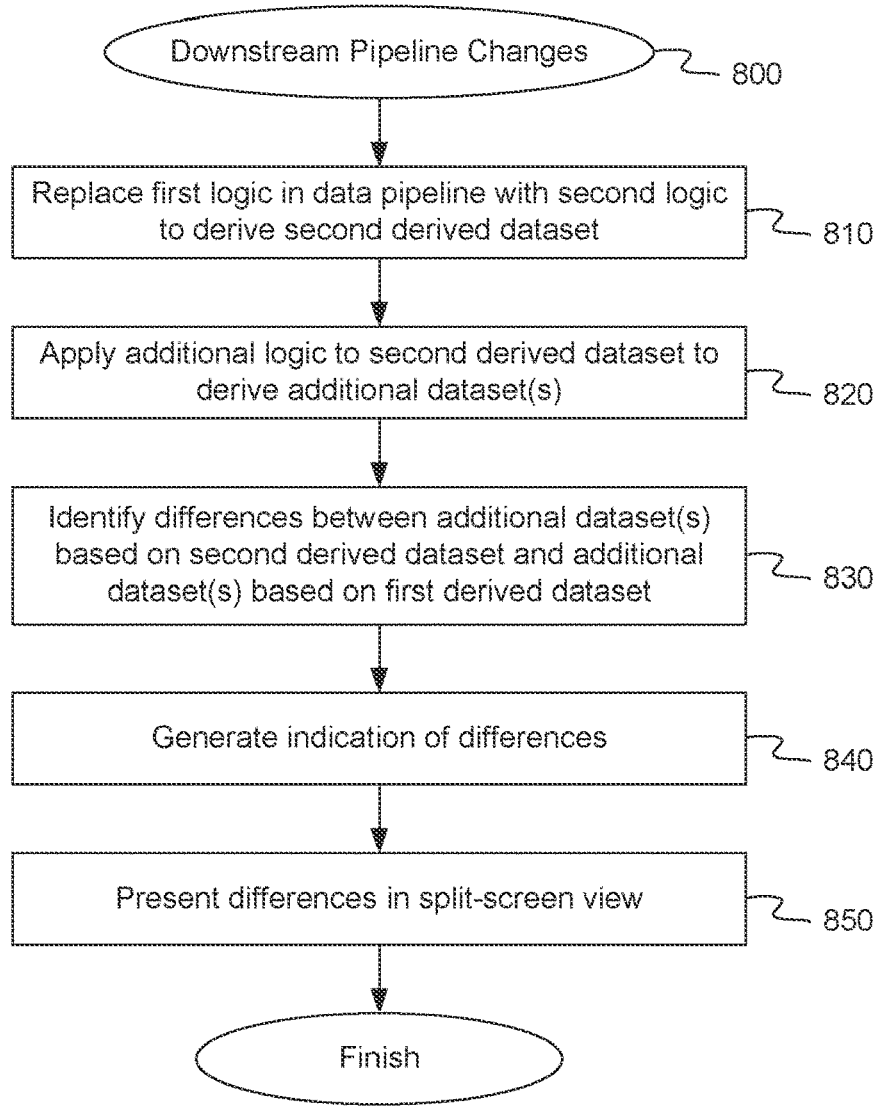
FIG. 8A is a flow diagram illustrating a method of determining downstream data pipeline changes, according to an implementation.

FIG. 8A is a flow diagram illustrating a method of determining downstream data pipeline changes, according to an implementation. The method 800 may be performed by processing logic that comprises hardware (e.g., circuitry, dedicated logic, programmable logic, microcode, etc.), software (e.g., instructions run on a processor to perform hardware simulation), or a combination thereof. In one implementation, method 800 may be performed by workbook management system 110, as shown in FIGS. 1 and 2.

Figure 8B:
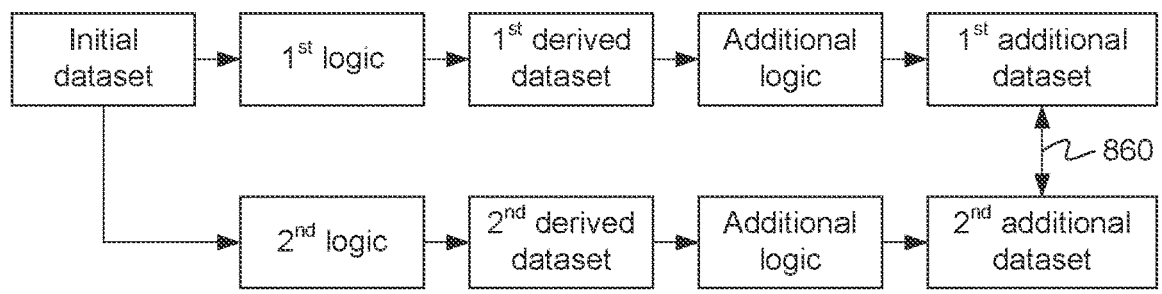
FIG. 8B is a block diagram illustrating a modified data pipeline, according to an implementation.

In one implementation, data pipeline manager 230 manages a data pipeline defined by pipeline data 278. The data pipeline may include the first logic and additional logic, to apply to the first derived dataset(s) to produce one or more first additional derived datasets. Starting with the initial dataset(s), data pipeline manager 230 may apply logic to generate a derived dataset(s) (e.g., the first derived dataset(s)). Data pipeline manager 230 may further apply additional logic to that derived dataset(s) to generate another derived dataset(s). Pipeline data 278 may define any number of stages of logic and derived datasets that continue in this fashion. Referring to FIG. 8A, at block 810, method 800 replaces the first logic in the data pipeline with the second logic to derive the second derived dataset(s), as shown in FIG. 8B. In one implementation, such as in request to perform a merge operation, prior to performing the merge operation, data pipeline manager 230 can replace the first logic (e.g., from the master branch) in the data pipeline with the second logic (e.g., from the test branch).

At block 820, method 800 applies the additional logic to the second derived dataset(s) to derive one or more second additional derived datasets, as shown in FIG. 8B. Due to the differences in logic that generated the first and second derived datasets respectively, the second derived dataset(s) may be different than the first derived dataset(s). As a result, when the additional logic is applied to the second derived dataset(s), the resulting additional derived datasets downstream in the data pipeline may also be different.

At block 830, method 800 identify one or more differences between the one or more second additional derived datasets and the one or more first additional derived datasets, as shown at 860 in FIG. 8B. Data pipeline manager 230 can compare the one or more second additional derived datasets to the one or more first additional derived datasets to identify any differences in the one or more second additional derived datasets resulting from replacing the first derived dataset(s) in the data pipeline with the second derived dataset(s).

At block 840, method 800 generate an indication of the differences between the one or more second additional derived datasets and the one or more first additional derived datasets, and at block 850, method 800 presents the differences to the user. In one implementation, the differences are presented side by side (e.g., in a split-screen interface). Accordingly, the user can see how the changes to the logic in the test branch affect downstream derived datasets in the data pipeline compared to if the first logic in the master branch were used in the data pipeline. User interface module 215 may then receive user input selecting which version of the logic to use (e.g., from the test branch or from the master branch) and data pipeline manager 230 can receive an indication of the selection in order to make any corresponding changes to pipeline data 278 when run in a production environment.

Figure 9:
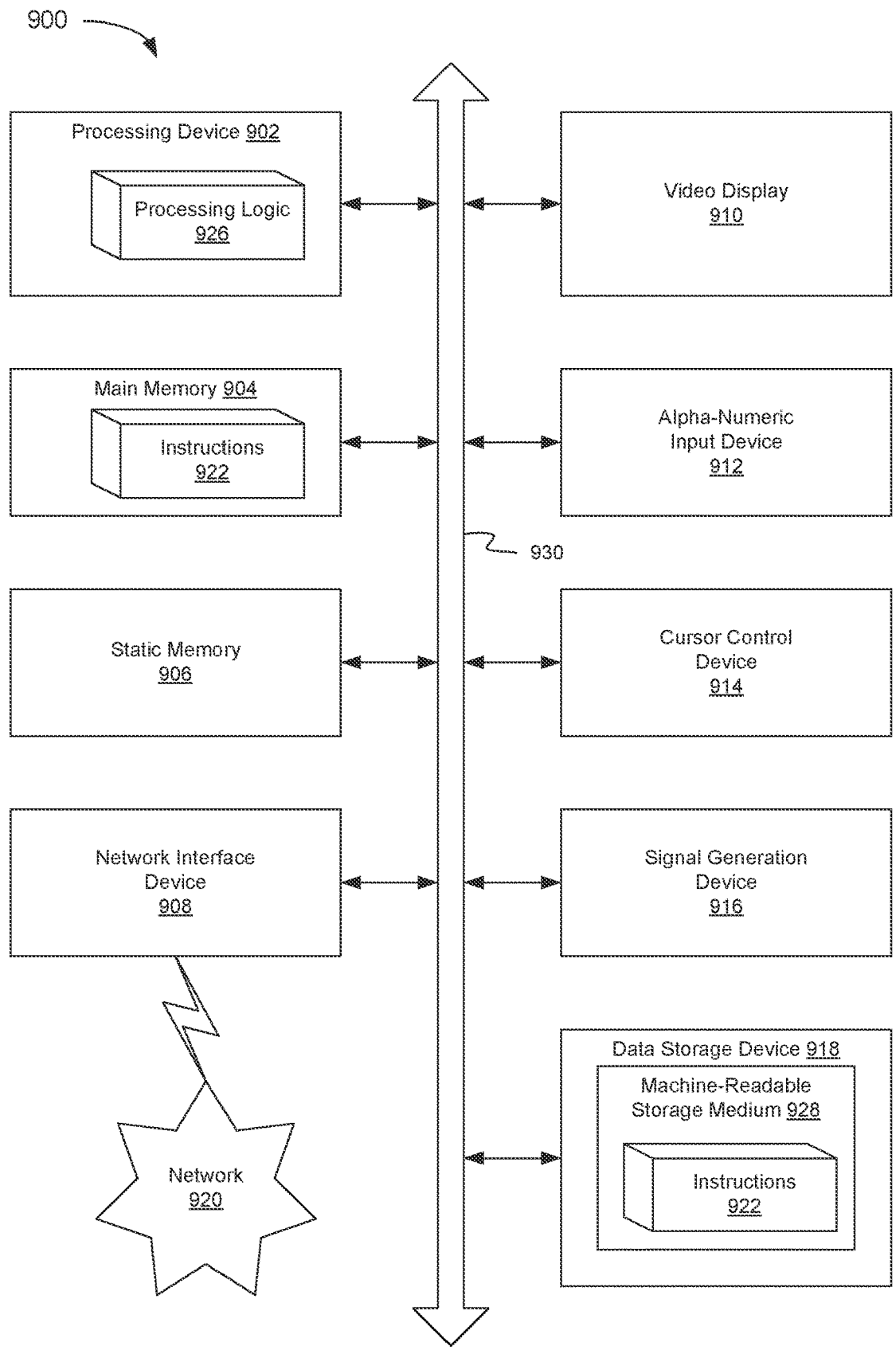
FIG. 9 is a block diagram illustrating a computer system, according to an implementation.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 900 may be representative of a computing device, such as a server of data management platform 102 running workbook management system 110 or a client computing system 130.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 928, on which is stored one or more set of instructions 922 (e.g., software) embodying any one or more of the methodologies of functions described herein. The instructions 922 may also reside, completely or at least partially, within the main memory 904 and/or within the processing device 902 during execution thereof by the computer system 900; the main memory 904 and the processing device 902 also constituting machine-accessible storage media. The instructions 922 may further be transmitted or received over a network 920 via the network interface device 908.

The machine-readable storage medium 928 may also be used to store instructions of data pipeline branching, as described herein. While the machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
identifying a master branch of a data pipeline comprising ordered data transformation operations, the master branch having a master branch entry in a branch data structure that associates one or more initial datasets, data transformation logic, and one or more derived datasets resulting from application of the data transformation logic to the one or more initial datasets, wherein the master branch entry comprises a first reference to a snapshot of an initial dataset, a first logic implementing a first data transformation operation, and a second reference to a snapshot of a first derived dataset resulting from applying the first logic to the initial dataset;
creating a first test branch having a first test branch entry in the branch data structure, wherein the first test branch comprises the first reference to the snapshot of the initial dataset and a second logic implementing a second data transformation operation;
generating a second derived dataset by applying the second logic to the snapshot of the initial dataset;
merging the first test branch into the master branch by replacing, in the master branch entry of the branch data structure, the first logic with the second logic; and
replacing, in the master branch entry of the branch data structure, the second reference to the snapshot of the first derived dataset with a third reference to a snapshot of the second derived dataset;
wherein the method is performed using one or more processors.

2. The method of claim 1, further comprising:
prior to updating the master branch to replace the first logic with the second logic, determining one or more differences between the first logic and the second logic;
generating an indication of the one or more differences between the first logic and the second logic; and
receiving user input confirming that the one or more differences between the first logic and the second logic are approved.

3. The method of claim 1, further comprising:
prior to updating the master branch to replace the second reference to the snapshot of the first derived dataset with the third reference to the snapshot of the second derived dataset, determining one or more differences between the first derived dataset and the second derived dataset;
generating an indication of the one or more differences between the first derived dataset and the second derived dataset; and
receiving user input confirming that the one or more differences between the first derived dataset and the second derived dataset are approved.

4. The method of claim 1, further comprising:
responsive to receiving user input requesting a second test branch corresponding to the master branch, creating the second test branch having a second test branch entry in the branch data structure, the second test branch entry comprising the first reference to the snapshot of the initial dataset, and a copy of the first logic;
receiving a request to modify the second test branch, the request comprising at least one change to the copy of the first logic;
modifying the second test branch independently of the master branch to include third logic reflecting the at least one change to the copy of the first logic, the third logic to be applied to the initial dataset to produce a third derived dataset, wherein modifying the second test branch comprises updating the second logic with the third logic in the second test branch entry of the branch data structure; and responsive to user input requesting a merge of the modified second test branch into the master branch, updating the master branch entry in the branch data structure to replace the second logic with the third logic and to replace the third reference to the snapshot of the second derived dataset with a fourth reference to a snapshot of the third derived dataset.

5. The method of claim 4, further comprising:

prior to updating the master branch, determining whether a merge conflict exists between the second logic and the third logic; and responsive to determining that the merge conflict exists, receiving user input comprising a selection of the third logic to resolve the merge conflict.

6. The method of claim 1, further comprising:

prior to updating the master branch to replace the second reference to the snapshot of the first derived dataset with the third reference to the snapshot of the second derived dataset, executing a data health check operation on the second derived dataset to determine whether the second derived dataset satisfies one or more conditions, the one or more conditions comprising a verification that a creation of the second derived dataset completed successfully and a verification that the second derived dataset is not stale.

7. The method of claim 1, further comprising:

responsive to user input requesting protection of the first test branch, preventing other users from further modifying the first test branch; and responsive to a request from another user to further modify the first test branch, creating a child test branch associated with the first test branch, the child test branch comprising the first reference to the snapshot of the initial dataset and a copy of the second logic.

8. The method of claim 7, further comprising:

responsive to updating the master branch, deleting the first test branch and associating the child test branch with the master branch.

9. The method of claim 1, wherein the data pipeline further comprises additional logic to be applied to the first derived dataset to produce one or more first additional derived datasets, the method further comprising:

replacing the first logic in the data pipeline with the second logic to derive the second derived dataset;

applying the additional logic to the second derived dataset to derive one or more second additional derived datasets;

identifying one or more differences between the one or more second additional derived datasets and the one or more first additional derived datasets; and generating an indication of the differences between the one or more second additional derived datasets and the one or more first additional derived datasets.

10. The method of claim 1, further comprising:

displaying, via a graphical user interface (GUI), a visual representation of the data pipeline, including a first graph corresponding to the master branch and a second graph corresponding to the first test branch, wherein the first graph includes a first node representing the initial dataset, a second node representing the first derived dataset, and a first edge connecting the first node and the second node, wherein the first edge references the first logic to be applied to the initial dataset in order to produce the first derived dataset, and wherein the second graph includes a third node representing the initial dataset, a fourth node representing the second derived dataset, and a second edge connecting the third node and the fourth node, wherein the second edge references the second logic to be applied to the initial dataset in order to produce the second derived dataset.

11. A system comprising:

a memory; and one or more processors coupled to the memory, the one or more processors to execute instructions to cause the one or more processors to perform operations comprising:

identifying a master branch of a data pipeline comprising ordered data transformation operations, the master branch having a master branch entry in a branch data structure that associates one or more initial datasets, data transformation logic, and one or more derived datasets resulting from application of the data transformation logic to the one or more initial datasets, wherein the master branch entry comprises a first reference to a snapshot of an initial dataset, a first logic implementing a first data transformation operation, and a second reference to a snapshot of a first derived dataset resulting from applying the first logic to the initial dataset;

creating a first test branch having a first test branch entry in the branch data structure, wherein the first test branch comprises the first reference to the snapshot of the initial dataset and a second logic implementing a second data transformation operation;

generating a second derived dataset by applying the second logic to the snapshot of the initial dataset;

merging the first test branch into the master branch by replacing, in the master branch entry of the branch data structure, the first logic with the second logic; and replacing, in the master branch entry of the branch data structure, the second reference to the snapshot of the first derived dataset with a third reference to a snapshot of the second derived dataset.

12. The system of claim 11, wherein the operations further comprise:

prior to updating the master branch to replace the first logic with the second logic, determining one or more differences between the first logic and the second logic;

generating an indication of the one or more differences between the first logic and the second logic; and receiving user input confirming that the one or more differences between the first logic and the second logic are approved.

13. The system of claim 11, wherein the operations further comprise:

prior to updating the master branch to replace the second reference to the snapshot of the first derived dataset with the third reference to the snapshot of the second derived dataset, determining one or more differences between the first derived dataset and the second derived dataset;

generating an indication of the one or more differences between the first derived dataset and the second derived dataset; and receiving user input confirming that the one or more differences between the first derived dataset and the second derived dataset are approved.

14. The system of claim 11, wherein the operations further comprise:

responsive to receiving user input requesting a second test branch corresponding to the master branch, creating the second test branch having a second test branch entry in the branch data structure, the second test branch entry comprising the first reference to the snapshot of the initial dataset, and a copy of the first logic;

receiving a request to modify the second test branch, the request comprising at least one change to the copy of the first logic;

modifying the second test branch independently of the master branch to include third logic reflecting the at least one change to the copy of the first logic, the third logic to be applied to the initial dataset to produce a third derived dataset, wherein modifying the second test branch comprises updating the second logic with the third logic in the second test branch entry of the branch data structure; and responsive to user input requesting a merge of the modified second test branch into the master branch, updating the master branch entry in the branch data structure to replace the second logic with the third logic and to replace the third reference to the snapshot of the second derived dataset with a fourth reference to a snapshot of the third derived dataset.

15. The system of claim 14, wherein the operations further comprise:

prior to updating the master branch, determining whether a merge conflict exists between the second logic and the third logic; and responsive to determining that the merge conflict exists, receiving user input comprising a selection of the third logic to resolve the merge conflict.

16. The system of claim 11, wherein the operations further comprise:

prior to updating the master branch to replace the second reference to the snapshot of the first derived dataset with the third reference to the snapshot of the second derived dataset, executing a data health check operation on the second derived dataset to determine whether the second derived dataset satisfies one or more conditions, the one or more conditions comprising a verification that a creation of the second derived dataset completed successfully and a verification that the second derived dataset is not stale.

17. The system of claim 11, wherein the operations further comprise:

responsive to user input requesting protection of the first test branch, preventing other users from further modifying the first test branch; and responsive to a request from another user to further modify the first test branch, creating a child test branch associated with the first test branch, the child test branch comprising the first reference to the snapshot of the initial dataset and a copy of the second logic.

18. A non-transitory computer readable storage medium storing instructions that, when executed by one or more processors, cause the one or more processors to perform operations comprising:

identifying a master branch of a data pipeline comprising ordered data transformation operations, the master branch having a master branch entry in a branch data structure that associates one or more initial datasets, data transformation logic, and one or more derived datasets resulting from application of the data transformation logic to the one or more initial datasets, wherein the master branch entry comprises a first reference to a snapshot of an initial dataset, a first logic implementing a first data transformation operation, and a second reference to a snapshot of a first derived dataset resulting from applying the first logic to the initial dataset;

creating a first test branch having a first test branch entry in the branch data structure, wherein the first test branch comprises the first reference to the snapshot of the initial dataset and a second logic implementing a second data transformation operation;

generating a second derived dataset by applying the second logic to the snapshot of the initial dataset;

merging the first test branch into the master branch by replacing, in the master branch entry of the branch data structure, the first logic with the second logic; and replacing, in the master branch entry of the branch data structure, the second reference to the snapshot of the first derived dataset with a third reference to a snapshot of the second derived dataset.

19. The non-transitory computer readable storage medium of claim 18, wherein the operations further comprise:

prior to updating the master branch to replace the first logic with the second logic, determining one or more differences between the first logic and the second logic;

generating an indication of the one or more differences between the first logic and the second logic; and receiving user input confirming that the one or more differences between the first logic and the second logic are approved.

* * * * *